(12) United States Patent
Li et al.

(10) Patent No.: US 12,520,258 B2
(45) Date of Patent: Jan. 6, 2026

(54) METHODS AND APPARATUSES FOR SELECTING A SYNCHRONIZATION BLOCK

(71) Applicant: QUALCOMM Incorporated, San Diego, CA (US)

(72) Inventors: Qiaoyu Li, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/272,316

(22) PCT Filed: Mar. 31, 2021

(86) PCT No.: PCT/CN2021/084313
§ 371 (c)(1),
(2) Date: Jul. 13, 2023

(87) PCT Pub. No.: WO2022/205039
PCT Pub. Date: Oct. 6, 2022

(65) Prior Publication Data
US 2024/0107471 A1     Mar. 28, 2024

(51) Int. Cl.
*H04W 76/10*     (2018.01)
*H04L 27/26*     (2006.01)
(Continued)

(52) U.S. Cl.
CPC ... *H04W 56/0015* (2013.01); *H04L 27/26025* (2021.01); *H04L 27/2605* (2013.01);
(Continued)

(58) Field of Classification Search
CPC ... H04B 7/0639; H04B 7/0695; H04W 16/28; H04W 56/0015; H04W 64/00; H04W 74/002; H04W 74/0833; H04W 76/10
(Continued)

(56) References Cited

U.S. PATENT DOCUMENTS 11,057,938 B2      7/2021   Islam et al.
2020/0367288 A1*  11/2020   Dahlman .......... H04W 74/0833
(Continued)

FOREIGN PATENT DOCUMENTS

CN     112106430 A    12/2020
WO     2019226420     11/2019
(Continued)

OTHER PUBLICATIONS

International Search Report and Written Opinion—PCT/CN2021/084313—ISA/EPO—Dec. 31, 2021.
(Continued)

*Primary Examiner* — Harun Chowdhury
(74) *Attorney, Agent, or Firm* — ArentFox Schiff LLP

(57) ABSTRACT

Aspects of the present disclosure include methods, apparatuses, and computer readable media for receiving a synchronization signal block (SSB) burst set having a plurality of SSBs that are time division multiplexed, wherein a first SSB of the plurality of SSBs and a second SSB of the plurality of SSBs have different numerologies or different waveforms, selecting a SSB of the plurality of SSBs, identifying cell information associated with a cell based on the SSB of the plurality of SSBs, and establishing a connection with the cell based on the cell information.

19 Claims, 14 Drawing Sheets

(51) Int. Cl.
*H04W 56/00* (2009.01)
*H04W 74/0833* (2024.01)
*H04W 84/06* (2009.01)

(52) U.S. Cl.
CPC ....... *H04W 74/0833* (2013.01); *H04W 76/10* (2018.02); *H04W 84/06* (2013.01)

(58) Field of Classification Search
USPC ........................................ 370/329, 350, 503
See application file for complete search history.

(56) References Cited

U.S. PATENT DOCUMENTS

2020/0413453 A1* 12/2020 Shao ................. H04W 74/0833
2022/0061105 A1*  2/2022 He .................... H04W 74/0833
2022/0345908 A1* 10/2022 Takano ................ H04W 16/28
2023/0379860 A1* 11/2023 Rao ...................... H04W 64/00

FOREIGN PATENT DOCUMENTS

WO  2020004520 A1  1/2020
WO  2021050045 A1  3/2021

OTHER PUBLICATIONS

Nokia, et al., "Email Discussion on SSB and Cell Relationship", 3GPP Draft, 3GPP TSG-RAN WG2 Meeting #102, R2-1806861, Busan, South Korea, May 21-25, 2018, 28 Pages.

* cited by examiner

| Param / Numerlogy (u) | -1 | -1B | 0 | 1 | 1 (ECP) | 2 | 2 (ECP) | 2 (eECP) | 3 | 4 |
|---|---|---|---|---|---|---|---|---|---|---|
| SCS (KHz) | 7.5 | 7.5 | 15 | 30 | 30 | 60 | 60 | 60 | 120 | 240 |
| Sym-Duration (us) | 133.3 | 133.3 | 66.67 | 33.33 | 33.33 | 16.67 | 16.67 | 16.67 | 8.33 | 4.17 |
| CP (us) | 9.40 | 9.40 | 4.69 | 2.34 | 8.33 | 1.17 | 4.16 | 8.33 | 0.57 | 0.29 |
| Total-Sym-Duration (us) | 142.7 | 142.7 | 71.35 | 35.68 | 41.67 | 17.84 | 20.83 | 25 | 8.92 | 4.46 |
| # OFDM syms per slot | 7 | 14 | 14 | 14 | 12 | 14 | 12 | 10 | 14 | 14 |

TRANSMITTING, TO A USER EQUIPMENT (UE), A SYNCHRONIZATION SIGNAL BLOCK (SSB) BURST SET HAVING A PLURALITY OF SSBS THAT ARE TIME DIVISION MULTIPLEXED, WHEREIN A FIRST SSB OF THE PLURALITY OF SSBS AND A SECOND SSB OF THE PLURALITY OF SSBS HAVE DIFFERENT NUMEROLOGIES OR DIFFERENT WAVEFORMS

1210

ESTABLISHING A CONNECTION WITH THE UE BASED ON THE UE SELECTING A SSB FROM THE PLURALITY OF SSBS AND IDENTIFYING CELL INFORMATION OF THE BS

*FIG. 12*

METHODS AND APPARATUSES FOR SELECTING A SYNCHRONIZATION BLOCK

CROSS-REFERENCE TO RELATED APPLICATIONS

This application is a 35 U.S.C. § 371 National Phase Application of PCT Application No. PCT/CN2021/084313 filed Mar. 31, 2021, entitled "METHODS AND APPARATUSES FOR SELECTING A SYNCHRONIZATION BLOCK," which is assigned to the assignee hereof and hereby incorporated by reference herein.

BACKGROUND

Aspects of the present disclosure relate generally to wireless communications, and more particularly, to apparatuses and methods for selecting a synchronization block.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) and one or more user equipment (UE) may communicate wirelessly, including via beamforming. However, the quality of the wireless communication channel may be impacted by the terrain between the BS and the UE, the altitude of the UE (e.g., such as an aircraft), and/or the velocity of the UE. For long distance (e.g., greater than 100 kilometers) coverage, the quality of the wireless communication channel may degrade. Therefore, in order for the BS and the UE to establish a reliable connection, improvements in wireless communication may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving a synchronization signal block (SSB) burst set having a plurality of SSBs that are time division multiplexed, wherein a first SSB of the plurality of SSBs and a second SSB of the plurality of SSBs have different numerologies or different waveforms, selecting a SSB of the plurality of SSBs, identifying cell information associated with a cell based on the SSB of the plurality of SSBs, and establishing a connection with the cell based on the cell information.

Other aspects of the present disclosure include a user equipment (UE) having a memory comprising instructions, a transceiver, and one or more processors operatively coupled with the memory and the transceiver, the one or more processors configured to execute instructions in the memory to receive a synchronization signal block (SSB) burst set having a plurality of SSBs that are time division multiplexed, wherein a first SSB of the plurality of SSBs and a second SSB of the plurality of SSBs have different numerologies or different waveforms, select a SSB of the plurality of SSBs, identify cell information associated with a cell based on the SSB of the plurality of SSBs, and establish a connection with the cell based on the cell information.

An aspect of the present disclosure includes a user equipment (UE) including means for receiving a synchronization signal block (SSB) burst set having a plurality of SSBs that are time division multiplexed, wherein a first SSB of the plurality of SSBs and a second SSB of the plurality of SSBs have different numerologies or different waveforms, means for selecting a SSB of the plurality of SSBs, means for identifying cell information associated with a cell based on the SSB of the plurality of SSBs, and means for establishing a connection with the cell based on the cell information.

Some aspects of the present disclosure include non-transitory computer readable media having instructions stored therein that, when executed by one or more processors of a user equipment (UE), cause the one or more processors to receive a synchronization signal block (SSB) burst set having a plurality of SSBs that are time division multiplexed, wherein a first SSB of the plurality of SSBs and a second SSB of the plurality of SSBs have different numerologies or different waveforms, select a SSB of the plurality of SSBs, identify cell information associated with a cell based on the SSB of the plurality of SSBs, and establish a connection with the cell based on the cell information.

Aspects of the present disclosure include methods by a base station (BS) for transmitting, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and establishing a connection with the UE based on the UE selecting a SSB from the plurality of SSBs and identifying cell information of the BS.

Other aspects of the present disclosure include a base station (BS) having a memory comprising instructions, a transceiver, and one or more processors operatively coupled with the memory and the transceiver, the one or more processors configured to execute instructions in the memory to transmit, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and establish a connection with the UE based on the UE selecting a SSB from the plurality of SSBs and identifying cell information of the BS.

An aspect of the present disclosure includes a base station (BS) including means for transmitting, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and means for establishing a connection with the UE based on the UE selecting a SSB from the plurality of SSBs and identifying cell information of the BS.

Some aspects of the present disclosure include non-transitory computer readable media having instructions stored therein that, when executed by one or more processors of a base station (BS), cause the one or more processors to transmit, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and establish a connection with the UE based on the UE selecting a SSB from the plurality of SSBs and identifying cell information of the BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 illustrates a table of examples of numerologies for ATG communications according to aspects of the present disclosure;

FIG. 12 illustrates an example of a method for transmitting an SSB according to aspects of the present disclosure.

DETAILED DESCRIPTION

Figure 1:
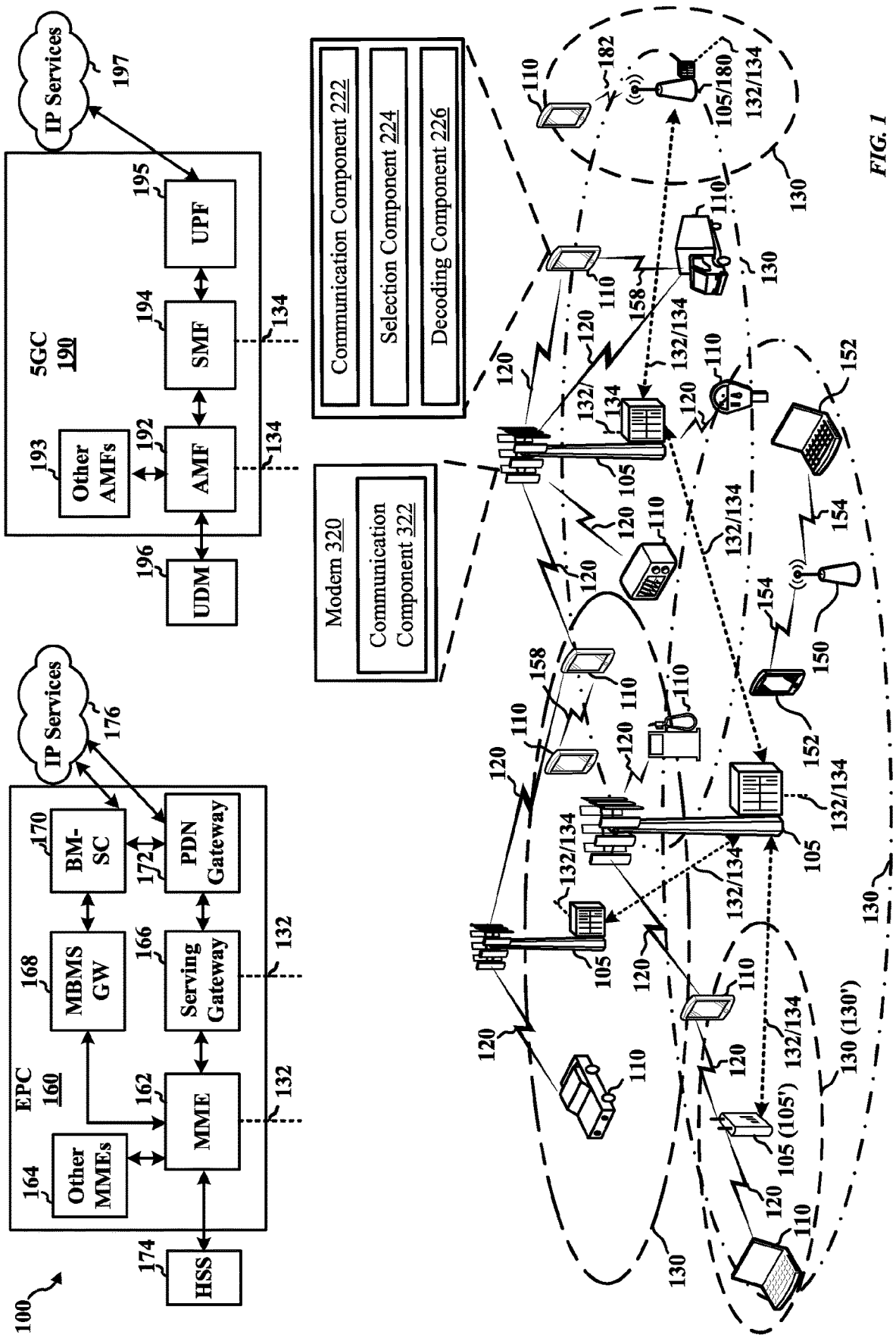
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects, user equipment (UEs) in a cell may experience different directional propagation profiles due to terrain, obstructions, and/or other environmental factors. The different directional propagation profiles mean that the UEs may experience different levels of inter-symbol interferences when receiving downlink control information from the base station (BS) due to the downlink transmission being reflected and/or refracted. If the BS transmits the downlink control information using a single numerology to account for the most severe inter-symbol interferences expected, the bandwidths of the UEs not encountering the most severe inter-symbol interferences may be unnecessarily reduced.

To mitigate one or more of the above-noted issues, in one implementation of the present disclosure, the BS may transmit more than one synchronization signal block (SSB) to the UEs. These multiple SSBs may be time division multiplexed. The UE may select one or more of the SSBs for decoding. The UE may decode the selected SSBs to obtain cell information associated with the BS. The UE may use the cell information to establish a wireless communication channel between the BS and the UE. The SSBs may have different numerologies and/or different waveforms.

For example, in air-to-ground (ATG) communication, frequency division multiplex (FDM) or time division multiplex (TDM) schemes may be utilized. In some instances, large inter-site distance (ISD) (e.g., 100 kilometers (km) to 200 km) and/or large coverage range (e.g., 300 km cell coverage range) may be deployed to reduce deployment cost. However, when an aircraft is above the sea level, the distance between the plane and a nearest BS may be more than 200 km (e.g., up to 300 km). Therefore, it may be desirable for an ATG network to provide up to 300 km of cell coverage.

One challenge with regard to ATG communications is that some systems may utilize non-disjoint operators' proprietary frequencies to deploy ATG and/or terrestrial networks. In other words, operators may be interested to adopt the same frequency for deploying both ATG and terrestrial networks to save frequency resource cost, however, in such a scenario, interference among ATG and the terrestrial networks may be non-negligible. Further, on-board ATG terminals may have higher transmission power and/or antenna gain than terrestrial terminals. Therefore, aspects of the present disclosure may address coexistence of ATG and terrestrial networks while maintaining ATG BS/UE core and performance.

Additionally, another challenge in ATG communications is that a large ISD (e.g., 100 km to 200 km in-land or 300 km coastal coverage) may require large timing advances (TAs) to avoid frequent handover and/or inter cell interferences. For example, the TA may be 2 milliseconds (ms) for 300 km coverage. Another challenge in ATG communications is that large Doppler effects (e.g., caused by aircraft flying) may require a large subcarrier spacing (SCS), short coherence time, and/or fast TA-drift. For example, at 1200 kilometer/hour (kmh), a large Doppler effect may be 0.77 kilohertz (kHz) at a carrier frequency of 700 megahertz (MHz), 3.89 kHz at a carrier frequency of 3.5 gigahertz (GHz), or 5.33 kHz at a carrier frequency of 4.8 GHz. When encountering a large Doppler effect, such as ones described above, the SCS may be larger than 7.5 kHz for a 700 MHz carrier frequency, 30 kHz or 60 kHz for a 3.5 GHz carrier frequency, and/or 600 kHz for a 4.8 GHz carrier frequency (assuming the receiver can tolerate a maximum line-of-sight (LoS) Doppler of approximately 10% of the SCS.

A further challenge for ATG communications is that, for various propagation scenarios, various cyclic prefix (CP) lengths and/or waveforms may be used. For example, for an en-route aircraft, a highly Rician, distinctive delay may be up to 2.5 km (i.e., 8.33 microseconds (p.$)). During climb and descent, and/or taking-off and landing, a Rayleigh delay may be smaller than the delay for an en-route aircraft. For parking/taxiing, the delay may be similar to terrestrial communication.

In some instances, an additional challenge for ATG communications is that large per-cell throughput may be required (e.g., over 1 gigabit per second (Gbps) data rate per aircraft). The throughput may be to support network traffic for an aircraft (e.g., 1.2 Gbps for download (DL) and 600 Mbps for upload (UL)). Further, the density of aircraft may fluctuate (e.g., more than 60 aircraft per 18,000 $km^2$). Yet another challenge in ATG communications is that interference towards terrestrial NR systems may be increased as an aircraft transmission (TX) beam-width becomes larger after 100 km-200 km propagation. Such interference may be highly dynamic and/or non-synchronized, considering dynamic TDD and/or large-propagation-delay effects.

Thus, as noted above, the present disclosure may provide improvements in ATG communications by the BS transmitting multiple SSB burst sets, and in some aspects such SSB burst sets may have different numerologies and/or waveforms, which allow the UE different options for establishing reliable communications.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells.

In one implementation, the UE 110 may include a communication component 222 configured to communicate with the BS 105 via a cellular network, a Wi-Fi network, or other wireless and wired networks. The UE 110 may include a selection component 224 configured to select an SSB from an SSB burst set that includes a plurality of SSBs. In some cases, different ones of the plurality of SSBs may have different numerologies and/or waveforms. The UE 110 may include a decoding component 226 configured to decode a selected SSB to obtain network information. In some implementations, the communication component 222, the selection component 224, and/or the decoding component 226 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
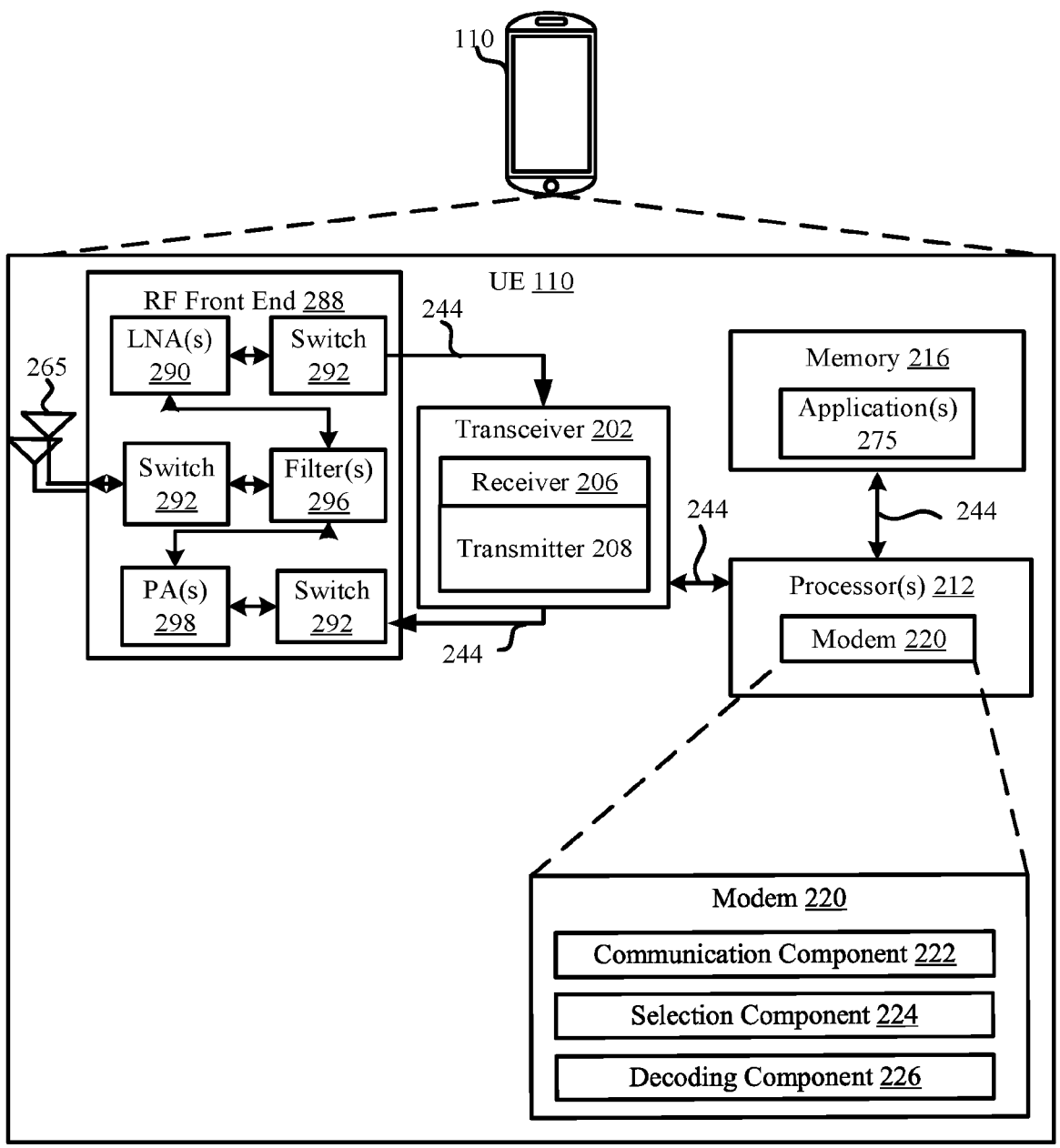
FIG. 2 is a schematic diagram of an example of a user equipment.

Referring to FIG. 2, one example of an implementation of the UE 110 may include a modem 220 having the communication component 222, the selection component 224, and/or the decoding component 226. In one implementation, the UE 110 may include a communication component 222 configured to communicate with the BS 105 via a cellular network, a Wi-Fi network, or other wireless and wired networks. The UE 110 may include a selection component 224 configured to select an SSB. The UE 110 may include a decoding component 226 configured to decode a selected SSB to obtain network information.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the selection component 224, and/or the decoding component 226 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the selection component 224, and/or the decoding component 226, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the selection component 224, and/or the decoding component 226, and/or one or more of the subcomponents, and/or data associated therewith, when UE 110 is operating at least one processor 212 to execute the communication component 222, the selection component 224, and/or the decoding component 226, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
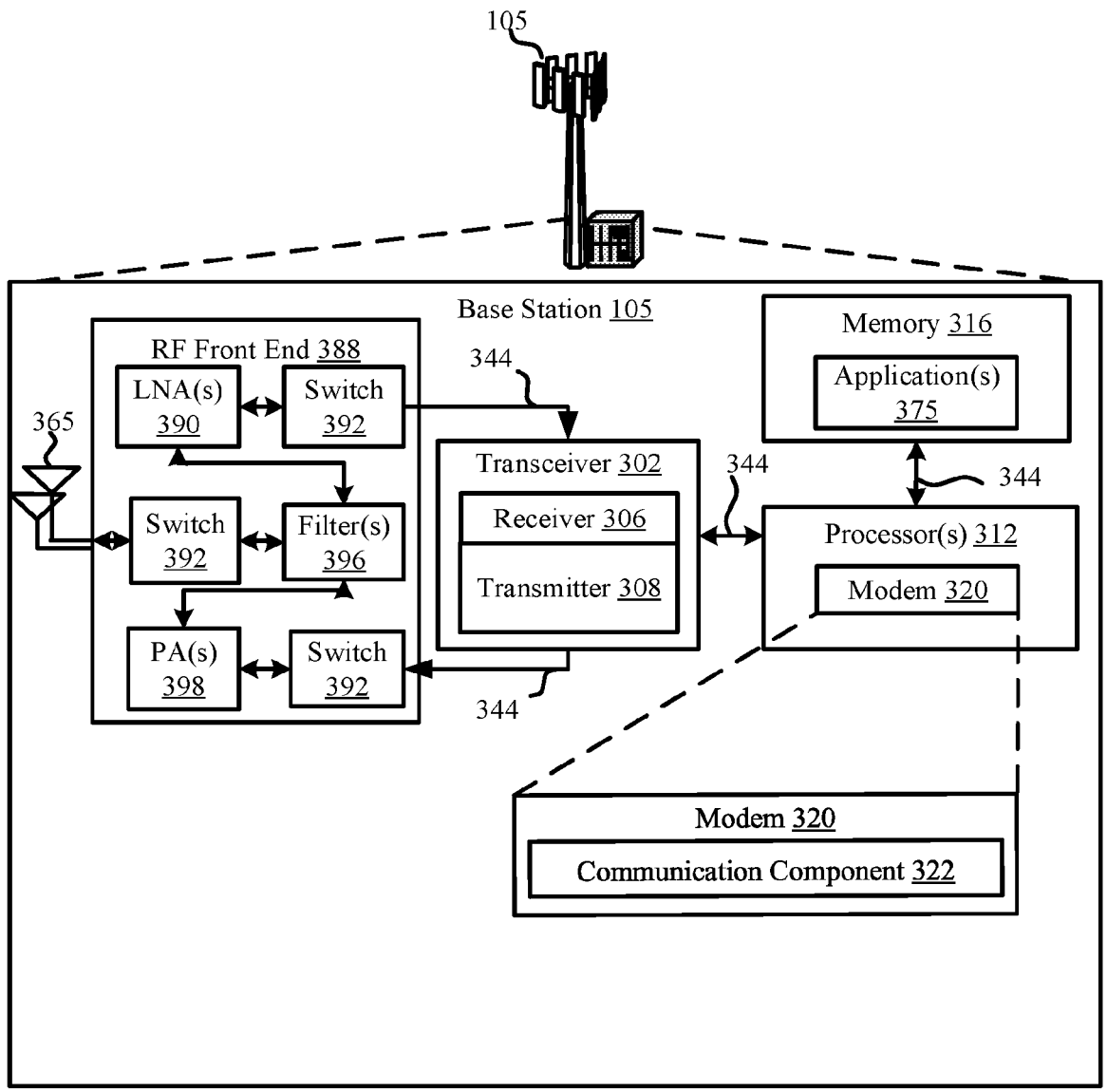
FIG. 3 is a schematic diagram of an example of a base station.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
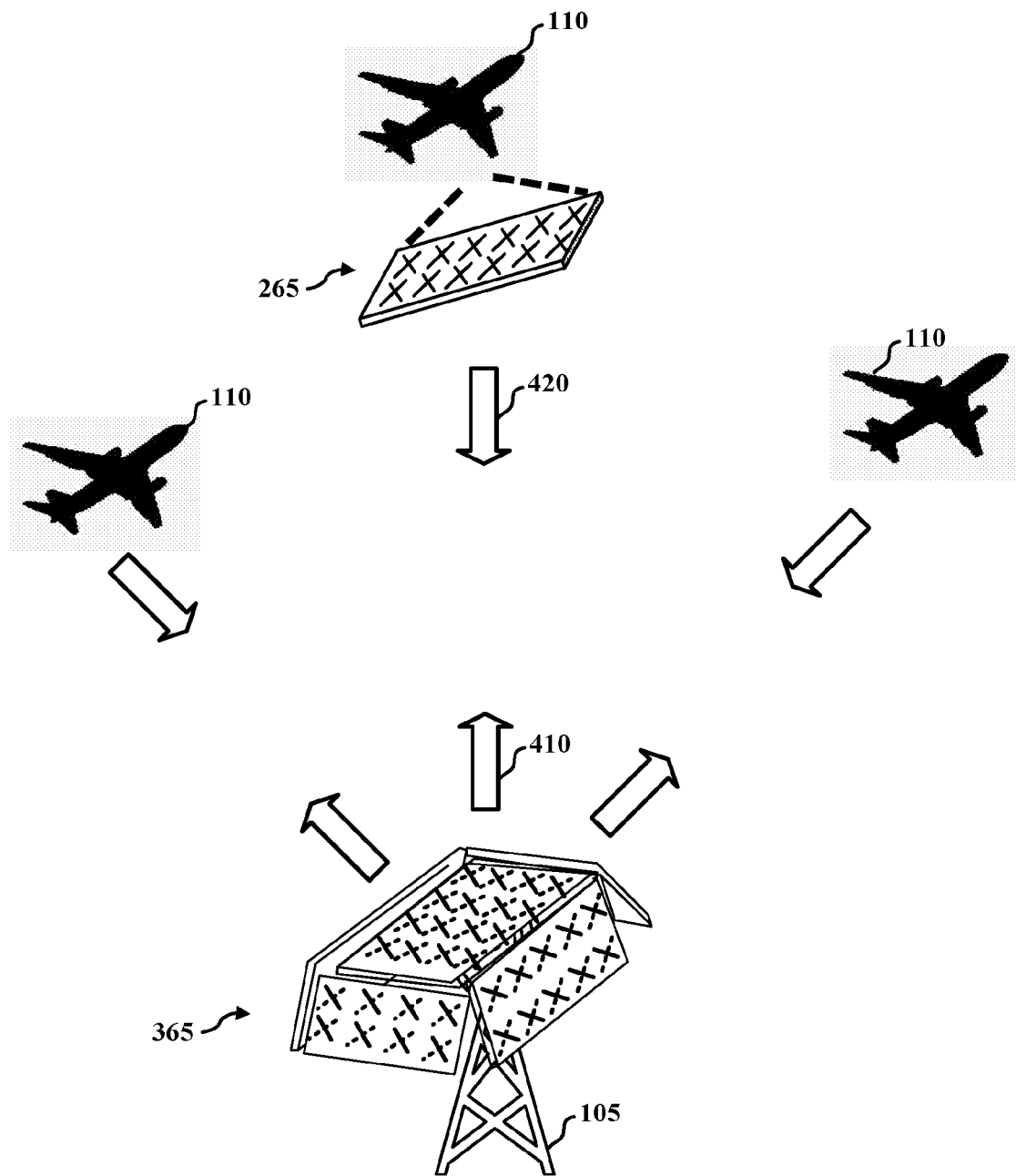
FIG. 4 is an example of an environment for wireless communication between a base station and UEs in the form of aircraft according to aspects of the present disclosure.

FIG. 4 is an example of an environment for wireless communication between a base station and one or more aircraft. In one example, the antennas 365 of the BS 105 may be up-tilting antenna arrays. The BS 105 may utilize 3-dimension (3D) multiple input multiple output (MIMO) for DL transmission 410. The antennas 265 of the UE 110 (e.g., an aircraft) may be for UL transmission 420. The antennas 265 of the UE 110 may be mounted at a bottom of the UE 110. In some cases, the antennas 265 may be an array antenna, where the aperture, the number of elements, and/or the number of arrays may depend on the size and/or type of the aircraft. In some instances, polarization based, UE-specific, multi-layer transmission may be possible (e.g., when the aircraft is en-route and/or during climbing/descent).

Figure 5:
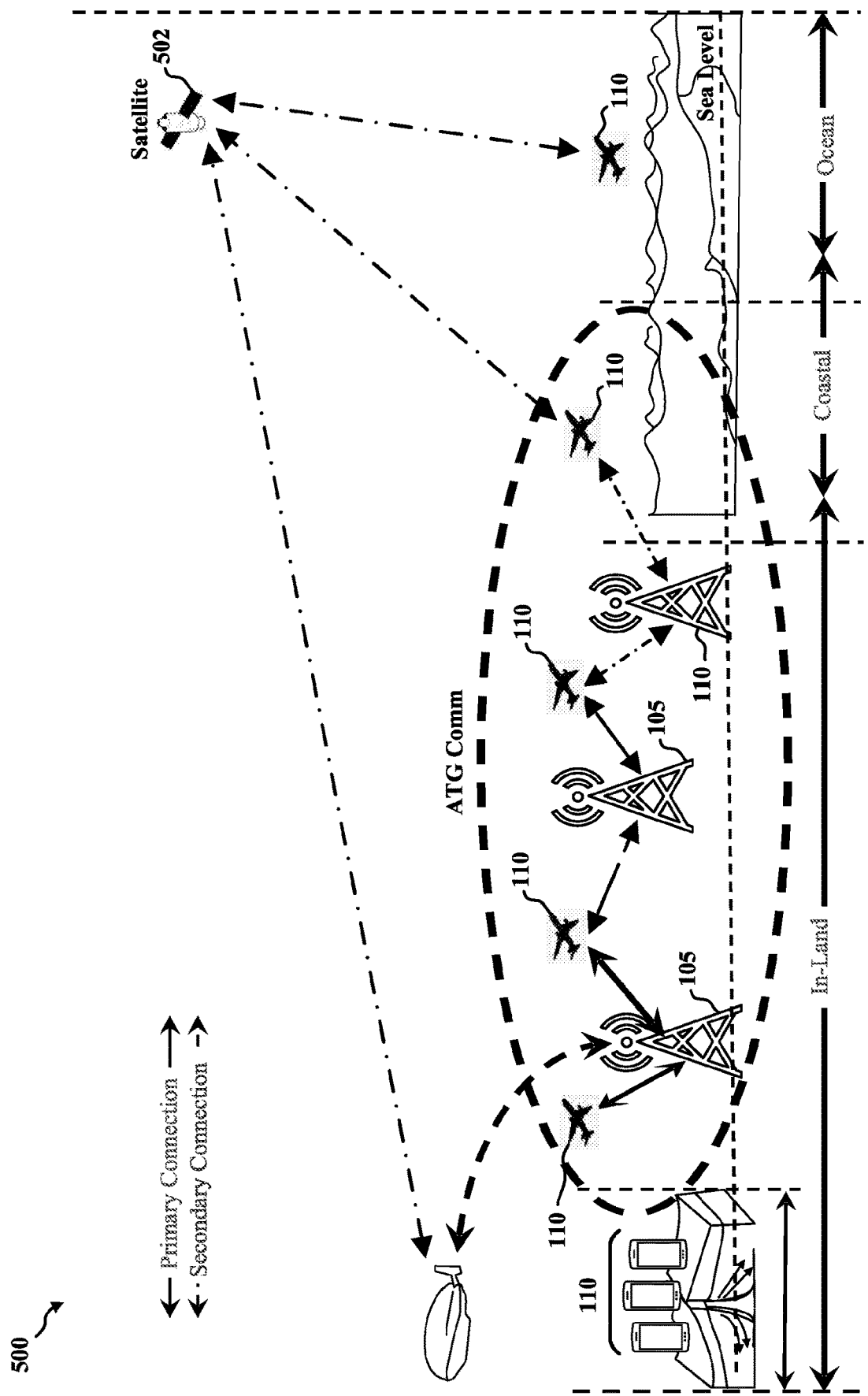
FIG. 5 is an example of an environment illustrating air to ground (ATG) communication according to aspects of the present disclosure.

FIG. 5 is an example of an environment illustrating air to ground communication. The environment 500 may include UEs 110 and/or BSs 105. In some implementations, ATG communications may include aircraft passenger communications, air traffic management, and/or aircraft surveillance and/or maintenance. In a certain scenario, the BS 105 may be on the ground, with an up-tiling antenna. The UE 110 (e.g., an aircraft) may be in the air, with an antenna at the bottom of the aircraft. ATG communications may be lower cost, higher throughput, and/or lower latency than a satellite communication based on a satellite 502.

Figure 6A:
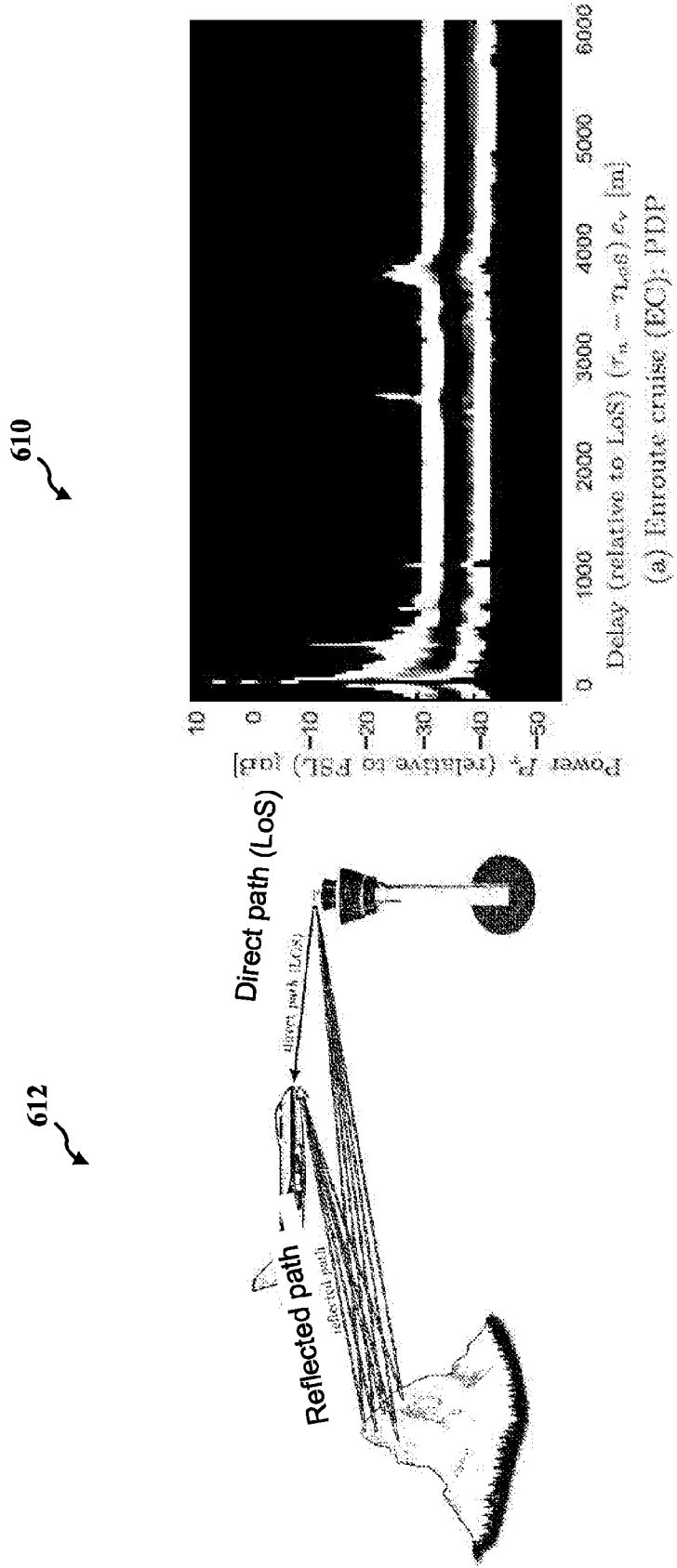
FIGS. 6A-C illustrate examples of channel measurements of power delay profiles according to aspects of the present disclosure.
Figure 6B:
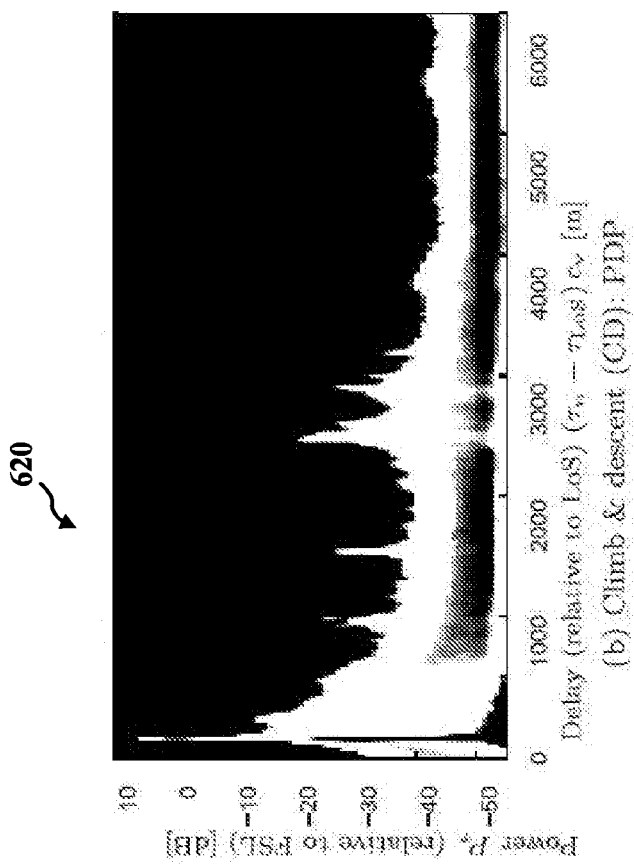
Figure 6B:
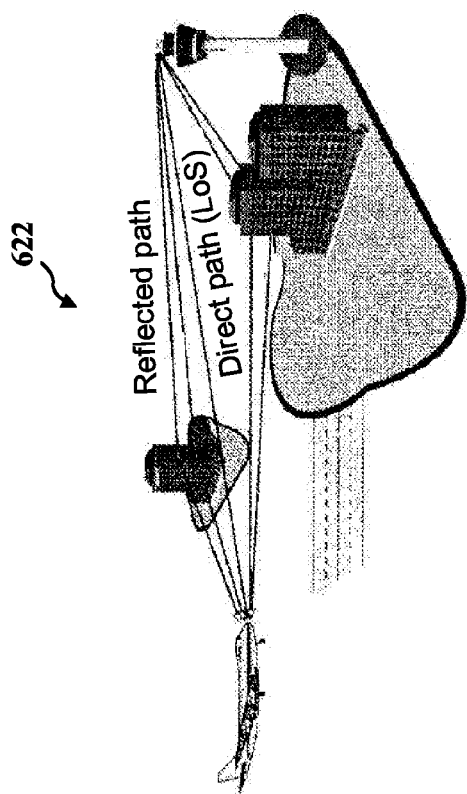
Figure 6C:
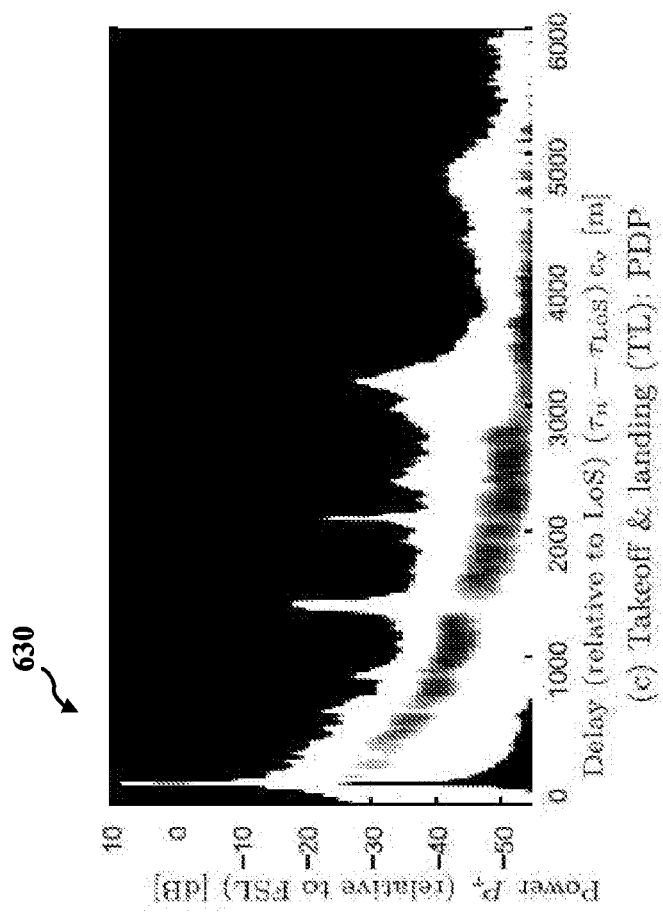
Figure 6C:
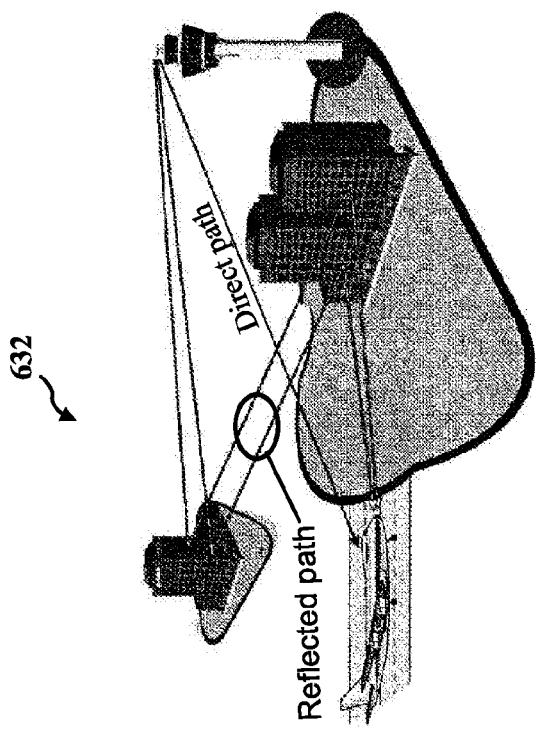

FIGS. 6A-C illustrate examples of channel measurements of power delay profiles. In some instances, the delay (e.g., due to mountains) may be greater than 8 μs, and the CP length may be greater than the delay. For example, at 1200 kilometer/hour (kmh), a large Doppler effect may be 0.77 kilohertz (kHz) at a carrier frequency of 700 megahertz (MHz), 3.89 kHz at a carrier frequency of 3.5 gigahertz (GHz), or 5.33 kHz at a carrier frequency of 4.8 GHz. When encountering a large Doppler effect, such as ones described above, the SCS may be larger than 7.5 kHz for a 700 MHz carrier frequency, 30 kHz or 60 kHz for a 3.5 GHz carrier frequency, and/or 600 kHz for a 4.8 GHz carrier frequency (assuming the receiver can tolerate a maximum line-of-sight (LoS) Doppler of approximately 10% of the SCS. A power delay profile (PDP) graph 610 may illustrate the PDP of an aircraft en-route 612. A PDP graph 620 may illustrate the PDP of an aircraft taking-off and/or landing 622. A PDP graph 630 may illustrate the PDP of an aircraft taxing 632.

FIG. 7 illustrates a table of examples of numerologies for ATG communications. A table 700 may include the parameters associated with different numerologies used in ATG communications. For example, for SCS of 7.5 kHz at a carrier frequency of 700 MHz, the CP may be 9.4 μs. A slot for the same numerology may occupy 7 symbols. Alternatively, a slot may occupy 2 ms with 14 symbols. In another example, for SCS of 30 kHz at a carrier frequency of 3.5 GHz, the CP may be 8.33 μs with 12 symbols per slot. In another example, for SCS of 60 kHz at a carrier frequency of 4.8 GHz, the CP may be 8.33 us with 10 symbols per slot. Other numerologies may be implemented according to aspects of the present disclosure.

Figure 8:
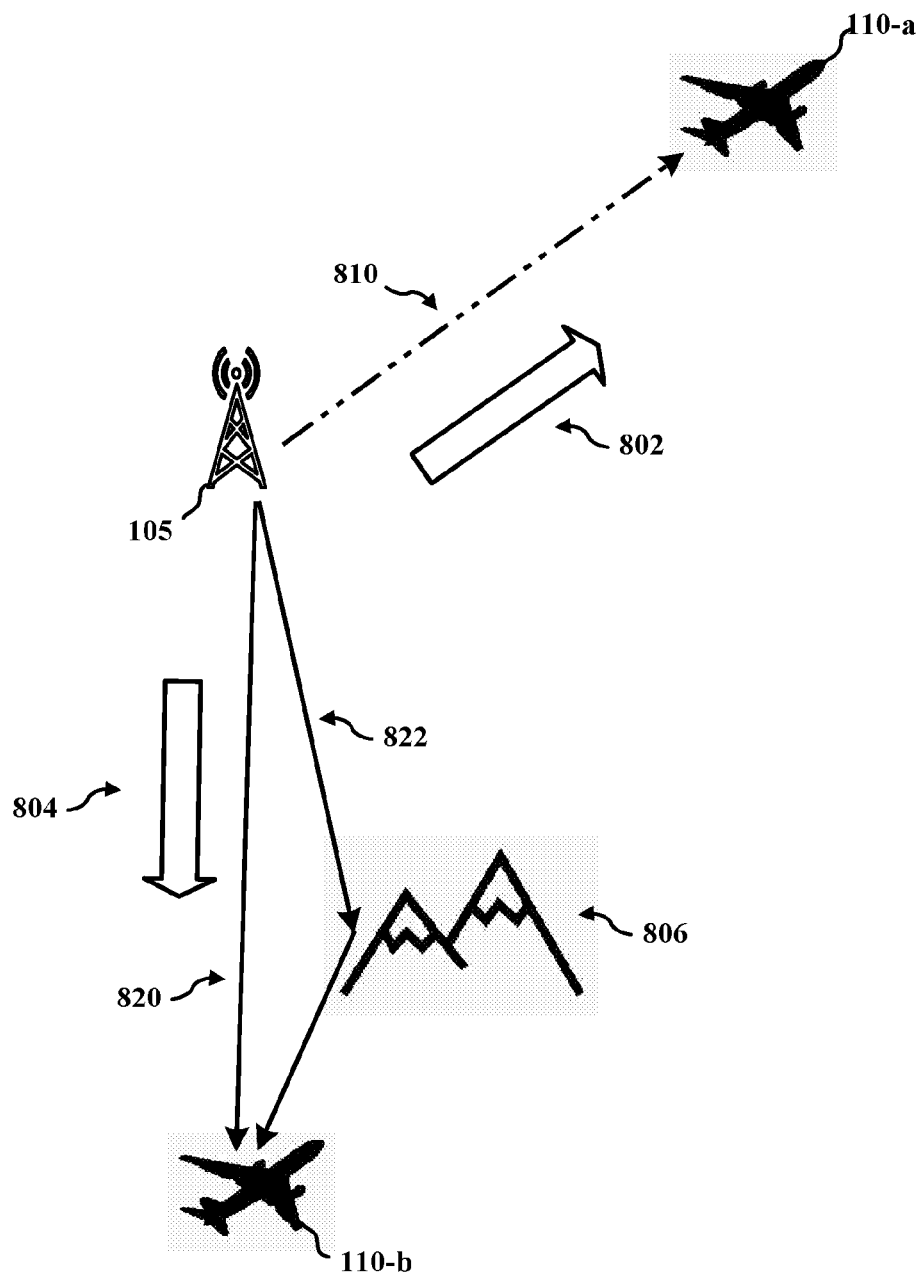
FIG. 8 illustrates an example of an environment for implementing synchronization signal block (SSB) selection according to aspects of the present disclosure.

FIG. 8 illustrates an example of an environment for implementing SSB selection. A first UE 110-*a* and/or a second UE 110-*b* may attempt to connect to the network associated with the BS 105. The BS 105 may transmit a SSB burst set (discussed below with respect to FIG. 9) having more than one SSBs that are time division multiplexed. The more than one SSBs may have different numerologies and/or waveforms to accommodate different directional propagation profiles experienced the UEs attempting to connect to the BS 105, such as the first UE 110-*a* and/or the second UE 110-*b*.

In certain aspects, a first UE 110-*a* may be an aircraft flying along a first route 802. The BS 105 may transmit first DL information to the first UE 110-*a* via first DL transmission 810 using beamforming. The first UE 110-*a* may receive the first DL transmission 810. The first DL transmission 810 may propagate to the first UE 110-*a* without significant reflection (e.g., the first DL transmission 810 and any reflection arrive at the first UE 110-*a* within a threshold time, such as 1 μs, 2 μs, or 5 μs) due to minimal obstructions along the first route 802.

In a different aspect, a second UE 110-*b* may be an aircraft flying along a second route 804. The second route 804 may include obstructions and/or obstacles, such as a mountain 806. The BS 105 may transmit second DL information to the second UE 110-*b* via second DL transmission 820 using beamforming. Due to the obstructions and/or obstacles along the second route 804, a portion of second DL transmission 820 may reflect off of the mountain 806 as reflected DL transmission 822. The second DL transmission 820 and the reflected DL transmission 822 may carry the same information. However, due to the reflection, the second DL transmission 820 may propagate a first distance to the second UE 110-b and the reflected DL transmission 822 may propagate a second distance, longer than the first distance, to the second UE 110-b. The second UE 110-b may receive the second DL transmission 820, followed by the reflected DL transmission 822. After the arrival of the second DL transmission 820 at the second UE 110-b, the reflected DL transmission 822 may arrive at the second UE 110-b after a threshold time (e.g., 1 μs, 2 μs, or 5 μs). To account for the difference in arrival times of the second DL transmission 820 and the reflected DL transmission 822, the BS 105 may utilize a CP having a length longer than the difference in arrival times. As such, the BS 105 may reduce inter-symbol interferences between the second DL transmission 820 and the reflected DL transmission 822.

In some instances, the first route may include coastal regions. The second route may include mountain regions.

In some instances, when an aircraft is flying in certain directions, mountains may be difficult to avoid even when beamforming is used. Due to long propagations, more reflections may occur and longer CP lengths may be used, or advanced waveform such as OTFS for higher SE. In some directions, mountains may not exist, or can be avoidable due to beamforming. As a result, less reflection may be expected, and shorter CP length may be used. FDM with different numerology SSBs may not be applicable in 4.8 GHz due to limited bandwidth and/or large SCS.

Figure 9:
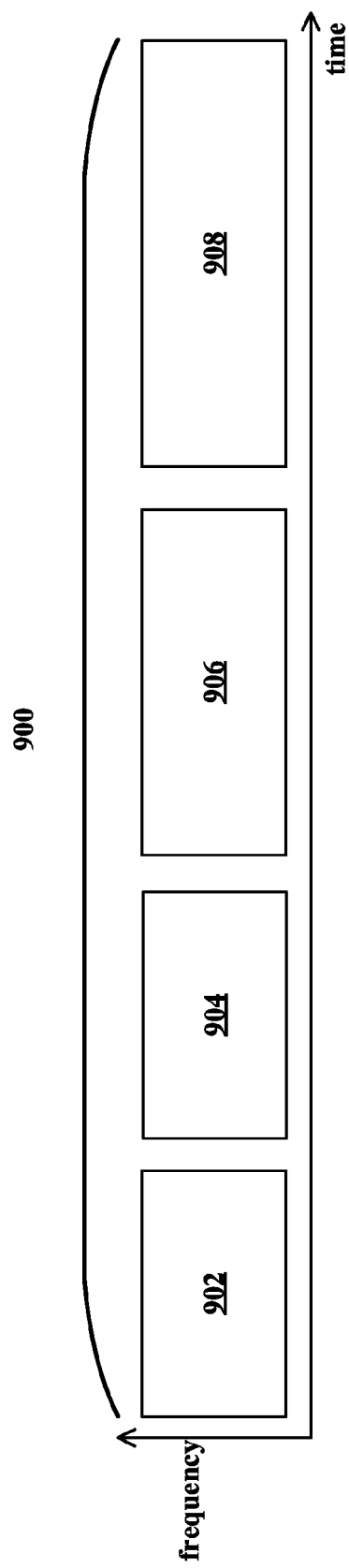
FIG. 9 illustrates an example of an SSB burst set according to aspects of the present disclosure.

FIG. 9 illustrates an example of a synchronization signal block burst set. A SSB burst set may include two or more SSBs with different numerologies and/or different waveforms. In some aspects, a SSB burst set 900 may include a first SSB 902 having a first numerology or a first waveform, a second SSB 904 having a second numerology or a second waveform, a third SSB 906 having a third numerology or a third waveform, and a fourth SSB 908 having a fourth numerology or a fourth waveform. The first SSB 902, the second SSB 904, the third SSB 906, and/or the fourth SSB 908 may include the same or different control information. The first waveform, the second waveform, the third waveform, and/or the fourth waveform may be the same or different. The first numerology, the second numerology, the third numerology, and/or the fourth numerology may be the same or different. For examples, one or more of the first SSB 902, the second SSB 904, the third SSB 906, and/or the fourth SSB 908 may include the numerologies and/or waveform illustrated in the table 700 (FIG. 7).

Referring to FIGS. 8 and 9, in some aspects, the BS 105 may transmit and/or broadcast the SSB burst set 900 to the first UE 110-a and/or the second UE 110-b. The first UE 110-a and/or the second UE 110-b may each select, via the selection component 224, one or more of the SSBs in in the SSB burst set 900 to obtain cell information associated with the cell of the BS 105. The first UE 110-a may select one or more SSBs in the SSB burst set 900 based on one or more of the first route, logic and/or rules stored in the memory 216 (e.g., technical standard recommendations/requirements), flight level information (e.g., altitude of the first UE 110-a), global navigation satellite system (GNSS) information (e.g., location of the first UE 110-a), a frequency band to be searched, or other criteria. Similarly, the second UE 110-b may select one or more SSBs in the SSB burst set 900 based on one or more of the first route, logic and/or rules stored in the memory 216 (e.g., technical standard recommendations/ requirements), flight level information (e.g., altitude of the second UE 110-b), global navigation satellite system (GNSS) information (e.g., location of the second UE 110-b), a frequency band to be searched, a frequency band to avoid, a SCS to be searched (e.g., searching only for SSBs with SCS of 60 kHz), a SCS to avoid (e.g., refrain from searching for SSBs with SCS of 60 kHz), or other criteria.

In some implementations, the first UE 110-a and/or the second UE 110-b may decode, via the decoding component 226, the selected SSB(s) to obtain cell information associated with the BS 105.

In an aspect, the BS 105 may transmit one or more of a master information block (MIB), remaining minimum system information (RMSI), other system information (OSI), and/or radio resource control (RRC) information to indicate the numerologies and/or waveforms of the first SSB 902, the second SSB 904, the third SSB 906, and/or the fourth SSB 908. The first UE 110-a and/or the second UE 110-b may identify the numerologies and/or waveforms of the first SSB 902, the second SSB 904, the third SSB 906, and/or the fourth SSB 908 via one or more of the MIB, the RMSI, the OSI, and/or the RRC information.

In a non-limiting example, the BS 105 may transmit or broadcast the SSB burst set 900. The first SSB 902 may have a SCS of 7.5 kHz, a symbol duration of about 133.3 μs, a CP of about 9.4 μs, a total symbol duration of about 142.7 μs, and 7 orthogonal frequency-division multiplexed (OFDM) symbols per slot. The second SSB 904 may have a SCS of 7.5 kHz, a symbol duration of about 133.3 μs, a CP of about 9.4 μs, a total symbol duration of about 142.7 μs, and 7 orthogonal frequency-division multiplexed (OFDM) symbols per slot. The third SSB 906 may have a SCS of 60 kHz, a symbol duration of about 16.67 μs, a CP of about 1.17 μs, a total symbol duration of about 17.84 μs, and 14 OFDM symbols per slot. The fourth SSB 908 may have a SCS of 60 kHz, a symbol duration of about 16.67 μs, a CP of about 8.33 μs, a total symbol duration of about 25 μs, and 10 OFDM symbols per slot.

The first UE 110-a may receive the SSB burst set 900. The first UE 110-a may obtain flight level information, such as the altitude of the first UE 110-a, from an internal altimeter (not shown) or from external transmission via the communication component 222. The altitude may indicate that the first UE 110-a is flying at a low flight level (i.e., below a threshold altitude). The first UE 110-a may obtain GNSS information indicating that the first UE 110-a is flying in a region with minimal obstructions (e.g., coastal regions). The first UE 110-a may be 100 km, 200 km, or 300 km away from the BS 105. Based on the altitude of the first UE 110-a and the location of the first UE 110-a, the first UE 110-a may utilize the selection component 224 to select the third SSB 906 due to the long distance between the first UE 110-a and the BS 105, and/or minimal reflection due to the minimal obstructions. The third SSB 906 has a short CP length (e.g., less than 5 μs). The third SSB 906 has a large SCS (e.g., greater than or equal to 30 kHz) that may be resistant to Doppler effect. After selecting the third SSB 906, the first UE 110-a may decode the third SSB 906, via the decoding component 226, to obtain cell information associated with the BS 105.

The second UE 110-b may receive the SSB burst set 900. The second UE 110-b may obtain flight level information, such as the altitude of the second UE 110-b, from an internal altimeter (not shown) or from external transmission via the communication component 222. The altitude may indicate that the second UE 110-b is flying at a high flight level (i.e., above a threshold altitude). The second UE 110-b may obtain GNSS information indicating that the second UE 110-b is above the mountain 806. The first UE 110-a may be 100 km, 200 km, or 300 km away from the BS 105. Based on the altitude of the second UE 110-b and the location of the second UE 110-b (being above the mountain 806), the second UE 110-b may utilize the selection component 224 to select the fourth SSB 908 due to the long distance between the second UE 110-b and the BS 105, and/or the expected reflection caused by the mountain 806. The fourth SSB 908 has a long CP length (e.g., greater than 5 μs) that may cause the second UE 110-b to encounter reduced inter-symbol interferences. The fourth SSB 908 has a large SCS (e.g., greater than or equal to 30 kHz) that may be resistant to Doppler effect. After selecting the fourth SSB 908, the second UE 110-b may decode the fourth SSB 908, via the decoding component 226, to obtain cell information associated with the BS 105.

Alternatively or additionally, the first UE 110-a and/or the second UE 110-b may search for both the third SSB 906 and the fourth SSB 908.

In some aspects, at high FLs above a certain threshold, UEs may be expected to only search for SSBs with SCS=60 kHz @eECP (FIG. 7). At costal areas, UE may be expected to only search for SSBs with SCS=60 kHz A normal-CP. At medium FL above mixed terrains, UE may be expected to search for SSBs with SCS=60 kHz @eECP and/or normal-CP. In some implementations, UE may not be expected to search for SCS=60 kHz in 700 MHz. In other instances, UE may be expected to only search for SCS=60 kHz @eECP and/or normal-CP in 4.8 GHz.

Figure 10:
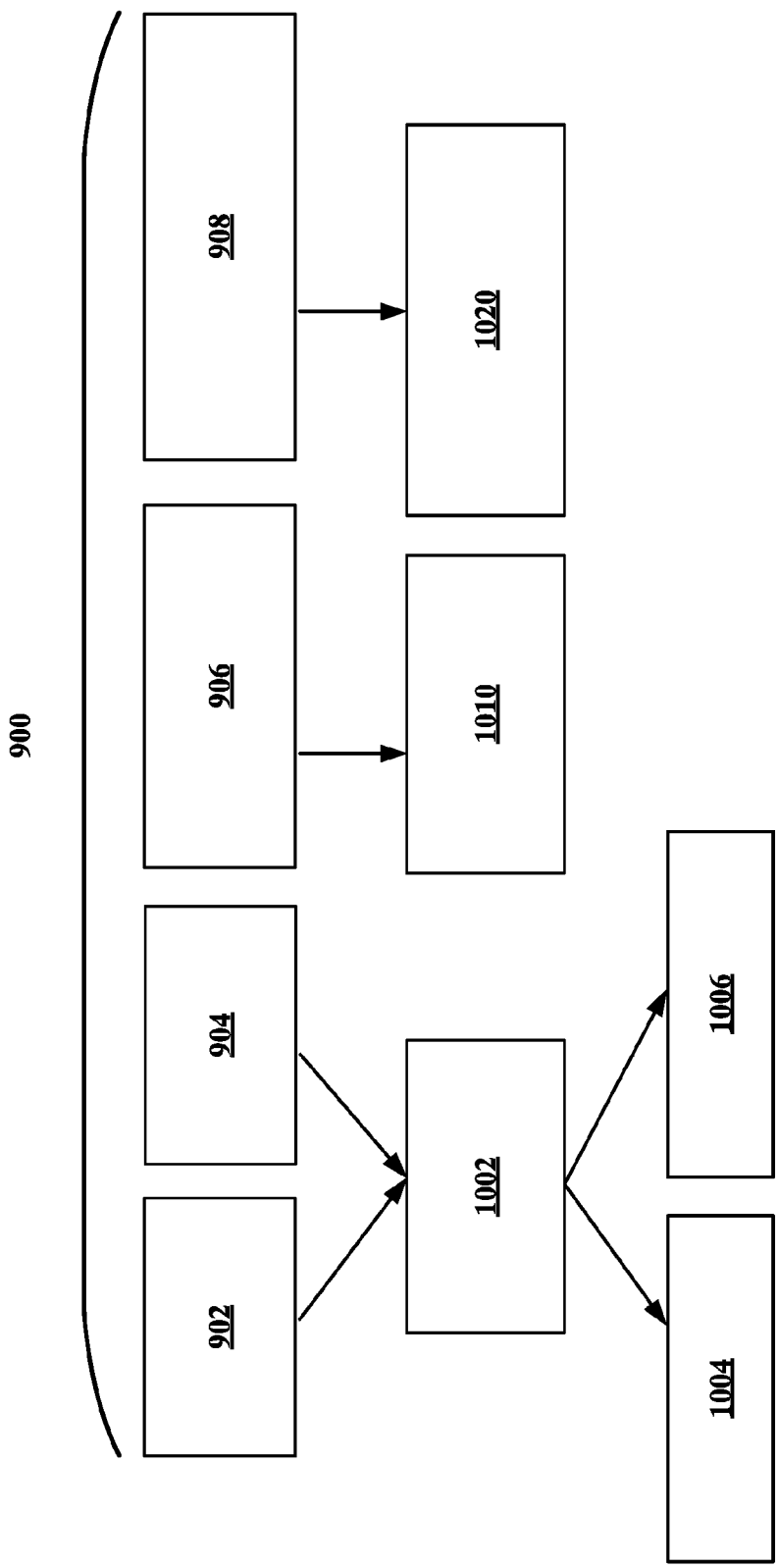
FIG. 10 illustrates examples of random access channel occasions associated with an SSB burst set according to aspects of the present disclosure.

FIG. 10 illustrates examples of random access channel occasions associated with a synchronization signal burst set. Referencing FIGS. 8 and 9, in some aspects, an UE, such as the first UE 110-a and/or the second UE 110-b may identify different random access channel (RACH) occasions (RO) and/or preamble formats associated with different numerologies and/or different waveforms of the SSBs in a SSB burst set. A preamble format may include at least one of a waveform (e.g., OFDM, single-carrier, orthogonal time frequency and space (OTFS), etc.), a SCS, a CP length, and/or a length of the preamble sequence. The UE may identify information associated with the preamble format from the RMSI. For contention-free RACH (e.g., beam failure recovery request (BFRQ)), the UE may be configured with multiple ROs and/or preamble formats associated with the SSBs with different numerologies and/or different waveforms.

In an aspect of the present disclosure, the first SSB 902 may indicate a first RO 1002. The first RO 1002 may be associated with a first preamble format. The first RO 1002 may indicate a first set of preamble sequences 1004 associated with the first SSB 902. The second SSB 904 may have the same numerology and/or waveform as the first SSB 902. As a result, the second SSB 904 may indicate the same RO as the first SSB 902, such as the first RO 1002. The first RO 1002 may indicate a second set of preamble sequences 1006 associated with the second SSB 904. The third SSB 906 may indicate a second RO 1010. The second RO 1010 may be associated with a second preamble format. The fourth SSB 908 may indicate a third RO 1020. The third RO 1020 may be associated with a third preamble format.

In certain aspects, for SSBs within the associated SSB burst set comprising the same numerology/waveform, a same RO with a same preamble format may be identified for such SSBs, while differentiating the SSBs is based on different preamble sequences. In some aspects, for the SSBs within the associated SSB burst set comprising different numerologies/waveforms, different ROs may be identified for such SSBs, and the preamble formats identified for such different ROs may also be different.

In certain aspects, when the UE (such as the first UE 110-a or the second UE 110-b) selects a SSB of the SSB burst set 900, the UE may identify a corresponding RO and/or preamble format associated with the selected SSB. For example, if the first UE 110-a selects the third SSB 906 of the SSB burst set 900, the first UE 110-a may identify the second RO 1010 and/or the second preamble format. The first UE 110-a may use the second RO 1010 and/or the second preamble format to initiate the RACH process to establish a connection with the BS 105.

Figure 11:
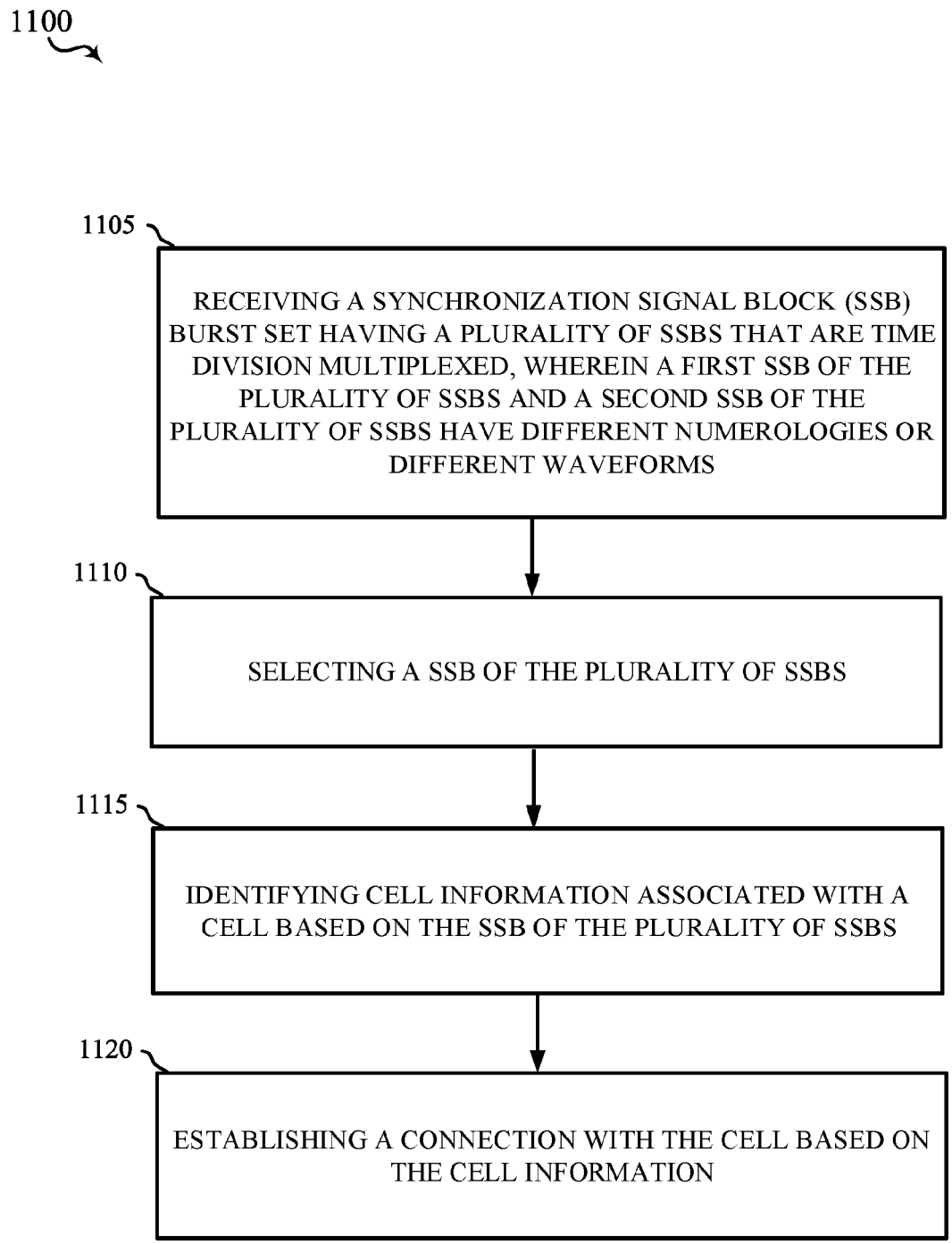
FIG. 11 illustrates an example of a method for selecting an SSB according to aspects of the present disclosure.

FIG. 11 illustrates an example of a method for selecting a synchronization signal block. For example, a method 1100 may be performed by the one or more of the processor 212, the memory 216, the applications 275, the modem 220, the transceiver 202, the receiver 206, the transmitter 208, the RF front end 288, the communication component 222, the selection component 224, and/or the decoding component 226, and/or one or more other components of the UE 110 in the wireless communication network 100.

At block 1105, the method 1100 may receive a synchronization signal block (SSB) burst set having a plurality of SSBs that are time division multiplexed, wherein a first SSB of the plurality of SSBs and a second SSB of the plurality of SSBs have different numerologies or different waveforms. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive a synchronization signal block (SSB) burst set having a plurality of SSBs that are time division multiplexed, wherein a first SSB of the plurality of SSBs and a second SSB of the plurality of SSBs have different numerologies or different waveforms as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving a synchronization signal block (SSB) burst set having a plurality of SSBs that are time division multiplexed, wherein a first SSB of the plurality of SSBs and a second SSB of the plurality of SSBs have different numerologies or different waveforms.

At block 1110, the method 1100 may select a SSB of the plurality of SSBs. For example, the selection component 224, the processor 212, the memory 216, the modem 220, and/or the applications 275 of the UE 110 may select a SSB of the plurality of SSBs as described above.

In certain implementations, the selection component 224, the processor 212, the memory 216, the modem 220, and/or the applications 275 may be configured to and/or may define means for selecting a SSB of the plurality of SSBs.

At block 1115, the method 1100 may identify cell information associated with a cell based on the SSB of the plurality of SSBs. For example, the decoding component 226, the processor 212, the memory 216, the modem 220, and/or the applications 275 of the UE 110 may identify cell information associated with a cell based on the SSB of the plurality of SSBs.

In certain implementations, the decoding component 226, the processor 212, the memory 216, the modem 220, and/or the applications 275 may be configured to and/or may define means for identifying cell information associated with a cell based on the SSB of the plurality of SSBs.

At block 1120, the method 1100 may establish a connection with the cell based on the cell information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may establish a connection with the cell based on the cell information as described above.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for establishing a connection with the cell based on the cell information.

Alternatively or additionally, the method 1100 may further include any of the methods above, further comprising obtaining at least one of flight level (FL) information or global navigation satellite system (GNSS), wherein selecting the SSB further comprises selecting the SSB based on the at least one of the FL information or the GNSS information.

Alternatively or additionally, the method 1100 may further include any of the methods above, further comprising determining whether an altitude of the UE indicated in the FL information is greater than a threshold altitude, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix.

Alternatively or additionally, the method 1100 may further include any of the methods above, further comprising determining whether a location of the UE indicated in the GNSS information is within a coastal region, wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

Alternatively or additionally, the method 1100 may further include any of the methods above, further comprising determining whether an altitude of the UE indicated in the FL information is greater than a first threshold altitude associated with a low altitude and less than a second threshold altitude associated with a high altitude, wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

Alternatively or additionally, the method 1100 may further include any of the methods above, further comprising identifying a frequency band to be searched, wherein selecting the SSB further comprises omitting, in response to the frequency band to be searched, one or more SSBs of the plurality of SSBs not associated with the frequency band to be searched.

Alternatively or additionally, the method 1100 may further include any of the methods above, further comprising identifying a frequency band to be searched, wherein selecting the SSB further comprises selecting, in response to the frequency band to be searched, one or more SSBs of the plurality of SSBs associated only with the frequency band to be searched.

Alternatively or additionally, the method 1100 may further include any of the methods above, further comprising identifying a same random access channel (RACH) occasion associated with both a first SSB of the plurality of SSBs and a second SSB of the plurality of SSBs, wherein the first SSB and the second SSB have a same numerology or a same waveform.

Alternatively or additionally, the method 1100 may further include any of the methods above, further comprising identifying a same preamble format associated with both a first SSB of the plurality of SSBs and a second SSB of the plurality of SSBs, wherein the first SSB and the second SSB have a same numerology or a same waveform.

Alternatively or additionally, the method 1100 may further include any of the methods above, further comprising identifying a same random access channel (RACH) occasion associated with both a first SSB of the plurality of SSBs and a second SSB of the plurality of SSBs, and identifying a same preamble format associated with both a first SSB of the plurality of SSBs and a second SSB of the plurality of SSBs, wherein the first SSB and the second SSB have a same numerology or a same waveform.

Alternatively or additionally, the method 1100 may further include any of the methods above, further comprising identifying a first preamble sequence associated with the first SSB and a second preamble sequence associated with the second SSB, wherein the first preamble sequence and the second preamble format are different.

Alternatively or additionally, the method 1100 may further include any of the methods above, further comprising identifying a first random access channel (RACH) occasion associated with a first SSB of the plurality of SSBs and a second RACH occasion associated with a second SSB of the plurality of SSBs, wherein the first RACH occasion and the second RACH occasion are different, wherein the first SSB has a first numerology or a first waveform different from a second numerology or a second waveform of the second SSB.

Alternatively or additionally, the method 1100 may further include any of the methods above, further comprising identifying a first preamble format associated with a first SSB of the plurality of SSBs and a second preamble format associated with a second SSB of the plurality of SSBs, wherein the first preamble format and the second preamble format are different, wherein the first SSB has a first numerology or a first waveform different from a second numerology or a second waveform of the second SSB.

Alternatively or additionally, the method 1100 may further include any of the methods above, further comprising identifying a first preamble format associated with a first SSB of the plurality of SSBs and a second preamble format associated with a second SSB of the plurality of SSBs, wherein the first preamble format and the second preamble format are different, and identifying a first random access channel (RACH) occasion associated with the first SSB and a second RACH occasion associated with the second SSB, wherein the first RACH occasion and the second RACH occasion are different, wherein the first SSB has a first numerology or a first waveform different from a second numerology or a second waveform of the second SSB.

Alternatively or additionally, the method 1100 may further include any of the methods above, further comprising transmitting a random access channel (RACH) message using a RACH occasion and a preamble format selected from a plurality of different RACH occasions and a plurality of different preamble formats based on a waveform or a numerology of the SSB selected from the plurality of SSBs.

FIG. 12 illustrates an example of a method for transmitting a synchronization signal block. For example, a method 1200 may be performed by the one or more of the processor 312, the memory 316, the applications 375, the modem 320, the transceiver 302, the receiver 306, the transmitter 308, the RF front end 388, the communication component 322, and/or one or more other components of the BS 105 in the wireless communication network 100.

At block 1205, the method 1200 may transmit, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms. For example, the communication component 322, the transceiver 302, the receiver 306, the transmitter 308, the RF front end 388, the subcomponents of the RF front end 388, the processor 312, the memory 316, the modem 320, and/or the applications 375 of the UE 110 may transmit, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms as described above.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms.

At block 1210, the method 1200 may establish a connection with the UE based on the UE selecting a SSB from the plurality of SSBs and identifying cell information of the BS. For example, the communication component 322, the transceiver 302, the receiver 306, the transmitter 308, the RF front end 388, the subcomponents of the RF front end 388, the processor 312, the memory 316, the modem 320, and/or the applications 375 of the UE 110 may establish a connection with the UE based on the UE selecting a SSB from the plurality of SSBs and identifying cell information of the BS as described above.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for establishing a connection with the UE based on the UE selecting a SSB from the plurality of SSBs and identifying cell information of the BS.

Alternatively or additionally, the method 1200 may further include any of the methods above, further comprising transmitting information indicating a same random access channel (RACH) occasion in both a first SSB of the plurality of SSBs and a second SSB of the plurality of SSBs, wherein the first SSB and the second SSB have a same numerology or a same waveform.

Alternatively or additionally, the method 1200 may further include any of the methods above, further comprising transmitting information indicating a same preamble format in both a first SSB of the plurality of SSBs and a second SSB of the plurality of SSBs, wherein the first SSB and the second SSB have a same numerology or a same waveform.

Alternatively or additionally, the method 1200 may further include any of the methods above, further comprising transmitting first information indicating a same random access channel (RACH) occasion in both a first SSB of the plurality of SSBs and a second SSB of the plurality of SSBs, and transmitting second information indicating a same preamble format in both a first SSB of the plurality of SSBs and a second SSB of the plurality of SSBs, wherein the first SSB and the second SSB have a same numerology or a same waveform.

Alternatively or additionally, the method 1200 may further include any of the methods above, further comprising transmitting first information indicating a first random access channel (RACH) occasion in a first SSB of the plurality of SSBs and second information indicating a second RACH occasion in a second SSB of the plurality of SSBs, wherein the first RACH occasion and the second RACH occasion are different, wherein the first SSB has a first numerology or a first waveform different from a second numerology or a second waveform of the second SSB.

Alternatively or additionally, the method 1200 may further include any of the methods above, further comprising transmitting first information indicating a first preamble format in a first SSB of the plurality of SSBs and second information indicating a second preamble format in a second SSB of the plurality of SSBs, wherein the first preamble format and the second preamble format are different, wherein the first SSB has a first numerology or a first waveform different from a second numerology or a second waveform of the second SSB.

Alternatively or additionally, the method 1200 may further include any of the methods above, further comprising transmitting first information a first preamble format in a first SSB of the plurality of SSBs and second information a second preamble format in a second SSB of the plurality of SSBs, wherein the first preamble format and the second preamble format are different and transmitting third information a first random access channel (RACH) occasion in the first SSB and transmitting fourth information a second RACH occasion in the second SSB, wherein the first RACH occasion and the second RACH occasion are different, wherein the first SSB has a first numerology or a first waveform different from a second numerology or a second waveform of the second SSB Alternatively or additionally, the method 1200 may further include any of the methods above, further comprising receiving a random access channel (RACH) message from the UE based on the UE using a RACH occasion and a preamble format selected from a plurality of different RACH occasions and a plurality of different preamble formats based on a waveform or a numerology of the SSB selected from the plurality of SSBs.

Alternatively or additionally, the method 1200 may further include any of the methods above, wherein the preamble format comprises at least one of a waveform, an subcarrier spacing (SCS) and/or cyclic prefix (CP) length, or a length of a preamble sequence.

Alternatively or additionally, the method 1200 may further include any of the methods above, further comprising transmitting remaining minimum system information associated with the SSB for identifying the RACH occasion and the preamble format.

Alternatively or additionally, the method 1200 may further include any of the methods above, further comprising transmitting configuration information including the plurality of different RACH occasions and the plurality of different preamble formats each associated with one of the different numerologies or one of the different waveforms.

Additional Implementations

Aspects of the present disclosure include methods by a user equipment (UE) for receiving a synchronization signal block (SSB) burst set having a plurality of SSBs that are time division multiplexed, wherein a first SSB of the plurality of SSBs and a second SSB of the plurality of SSBs have different numerologies or different waveforms, selecting a SSB of the plurality of SSBs, identifying cell information associated with a cell based on the SSB of the plurality of SSBs, and establishing a connection with the cell based on the cell information.

The method above, further comprising obtaining at least one of flight level (FL) information or global navigation satellite system (GNSS), wherein selecting the SSB further comprises selecting the SSB based on the at least one of the FL information or the GNSS information.

Any of the methods above, further comprising determining whether an altitude of the UE indicated in the FL information is greater than a threshold altitude, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix.

Any of the methods above, further comprising determining whether a location of the UE indicated in the GNSS information is within a coastal region, wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

Any of the methods above, further comprising determining whether an altitude of the UE indicated in the FL information is greater than a first threshold altitude associated with a low altitude and less than a second threshold altitude associated with a high altitude, wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

Any of the methods above, further comprising identifying a frequency band to be searched, wherein selecting the SSB further comprises omitting, in response to the frequency band to be searched, one or more SSBs of the plurality of SSBs not associated with the frequency band to be searched.

Any of the methods above, further comprising identifying a frequency band to be searched, wherein selecting the SSB further comprises selecting, in response to the frequency band to be searched, one or more SSBs of the plurality of SSBs associated only with the frequency band to be searched.

Any of the methods above, further comprising identifying a same random access channel (RACH) occasion associated with both a first SSB of the plurality of SSBs and a second SSB of the plurality of SSBs, wherein the first SSB and the second SSB have a same numerology or a same waveform.

Any of the methods above, further comprising identifying a same preamble format associated with both a first SSB of the plurality of SSBs and a second SSB of the plurality of SSBs, wherein the first SSB and the second SSB have a same numerology or a same waveform.

Any of the methods above, further comprising identifying a same random access channel (RACH) occasion associated with both a first SSB of the plurality of SSBs and a second SSB of the plurality of SSBs, and identifying a same preamble format associated with both a first SSB of the plurality of SSBs and a second SSB of the plurality of SSBs, wherein the first SSB and the second SSB have a same numerology or a same waveform.

Any of the methods above, further comprising identifying a first preamble sequence associated with the first SSB and a second preamble sequence associated with the second SSB, wherein the first preamble sequence and the second preamble format are different.

Any of the methods above, further comprising identifying a first random access channel (RACH) occasion associated with a first SSB of the plurality of SSBs and a second RACH occasion associated with a second SSB of the plurality of SSBs, wherein the first RACH occasion and the second RACH occasion are different, wherein the first SSB has a first numerology or a first waveform different from a second numerology or a second waveform of the second SSB.

Any of the methods above, further comprising identifying a first preamble format associated with a first SSB of the plurality of SSBs and a second preamble format associated with a second SSB of the plurality of SSBs, wherein the first preamble format and the second preamble format are different, wherein the first SSB has a first numerology or a first waveform different from a second numerology or a second waveform of the second SSB.

Any of the methods above, further comprising identifying a first preamble format associated with a first SSB of the plurality of SSBs and a second preamble format associated with a second SSB of the plurality of SSBs, wherein the first preamble format and the second preamble format are different, and identifying a first random access channel (RACH) occasion associated with the first SSB and a second RACH occasion associated with the second SSB, wherein the first RACH occasion and the second RACH occasion are different, wherein the first SSB has a first numerology or a first waveform different from a second numerology or a second waveform of the second SSB.

Any of the methods above, further comprising transmitting a random access channel (RACH) message using a RACH occasion and a preamble format selected from a plurality of different RACH occasions and a plurality of different preamble formats based on a waveform or a numerology of the SSB selected from the plurality of SSBs.

Any of the methods above, wherein the preamble format comprises at least one of a waveform, an subcarrier spacing (SCS) and/or cyclic prefix (CP) length, or a length of a preamble sequence.

Any of the methods above, further comprising decoding remaining minimum system information associated with the SSB to identify the RACH occasion and the preamble format.

Any of the methods above, further comprising receiving configuration information including the plurality of different RACH occasions and the plurality of different preamble formats each associated with one of the different numerologies or one of the different waveforms.

Other aspects of the present disclosure include a user equipment (UE) having a memory comprising instructions, a transceiver, and one or more processors operatively coupled with the memory and the transceiver, the one or more processors configured to execute instructions in the memory to receive a synchronization signal block (SSB) burst set having a plurality of SSBs that are time division multiplexed, wherein a first SSB of the plurality of SSBs and a second SSB of the plurality of SSBs have different numerologies or different waveforms, select a SSB of the plurality of SSBs, identify cell information associated with a cell based on the SSB of the plurality of SSBs, and establish a connection with the cell based on the cell information.

The UE above, wherein the one or more processors are further configured to obtain at least one of flight level (FL) information or global navigation satellite system (GNSS), wherein selecting the SSB further comprises selecting the SSB based on the at least one of the FL information or the GNSS information.

Any of the UEs above, wherein the one or more processors are further configured to determine whether an altitude of the UE indicated in the FL information is greater than a threshold altitude, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix.

Any of the UEs above, wherein the one or more processors are further configured to determine whether a location of the UE indicated in the GNSS information is within a coastal region, wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

Any of the UEs above, wherein the one or more processors are further configured to determine whether an altitude of the UE indicated in the FL information is greater than a first threshold altitude associated with a low altitude and less than a second threshold altitude associated with a high altitude, wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

Any of the UEs above, wherein the one or more processors are further configured to identify a frequency band to be searched, wherein selecting the SSB further comprises omitting, in response to the frequency band to be searched, one or more SSBs of the plurality of SSBs not associated with the frequency band to be searched.

Any of the UEs above, wherein the one or more processors are further configured to identify a frequency band to be searched, wherein selecting the SSB further comprises selecting, in response to the frequency band to be searched, one or more SSBs of the plurality of SSBs associated only with the frequency band to be searched.

Any of the UEs above, wherein the one or more processors are further configured to identify a same random access channel (RACH) occasion associated with both a first SSB of the plurality of SSBs and a second SSB of the plurality of SSBs, wherein the first SSB and the second SSB have a same numerology or a same waveform.

Any of the UEs above, wherein the one or more processors are further configured to identify a same preamble format associated with both a first SSB of the plurality of SSBs and a second SSB of the plurality of SSBs, wherein the first SSB and the second SSB have a same numerology or a same waveform.

Any of the UEs above, wherein the one or more processors are further configured to identify a same random access channel (RACH) occasion associated with both a first SSB of the plurality of SSBs and a second SSB of the plurality of SSBs, and identify a same preamble format associated with both a first SSB of the plurality of SSBs and a second SSB of the plurality of SSBs, wherein the first SSB and the second SSB have a same numerology or a same waveform.

Any of the UEs above, wherein the one or more processors are further configured to identify a first preamble sequence associated with the first SSB and a second preamble sequence associated with the second SSB, wherein the first preamble sequence and the second preamble format are different.

Any of the UEs above, wherein the one or more processors are further configured to identify a first random access channel (RACH) occasion associated with a first SSB of the plurality of SSBs and a second RACH occasion associated with a second SSB of the plurality of SSBs, wherein the first RACH occasion and the second RACH occasion are different, wherein the first SSB has a first numerology or a first waveform different from a second numerology or a second waveform of the second SSB.

Any of the UEs above, wherein the one or more processors are further configured to identify a first preamble format associated with a first SSB of the plurality of SSBs and a second preamble format associated with a second SSB of the plurality of SSBs, wherein the first preamble format and the second preamble format are different, wherein the first SSB has a first numerology or a first waveform different from a second numerology or a second waveform of the second SSB.

Any of the UEs above, wherein the one or more processors are further configured to identify a first preamble format associated with a first SSB of the plurality of SSBs and a second preamble format associated with a second SSB of the plurality of SSBs, wherein the first preamble format and the second preamble format are different, and identify a first random access channel (RACH) occasion associated with the first SSB and a second RACH occasion associated with the second SSB, wherein the first RACH occasion and the second RACH occasion are different, wherein the first SSB has a first numerology or a first waveform different from a second numerology or a second waveform of the second SSB.

Any of the UEs above, wherein the one or more processors are further configured to transmit a random access channel (RACH) message using a RACH occasion and a preamble format selected from a plurality of different RACH occasions and a plurality of different preamble formats based on a waveform or a numerology of the SSB selected from the plurality of SSBs.

Any of the UEs above, wherein the preamble format comprises at least one of a waveform, an subcarrier spacing (SCS) and/or cyclic prefix (CP) length, or a length of a preamble sequence.

Any of the UEs above, wherein the one or more processors are further configured to decode remaining minimum system information associated with the SSB to identify the RACH occasion and the preamble format.

Any of the UEs above, wherein the one or more processors are further configured to receive configuration information including the plurality of different RACH occasions and the plurality of different preamble formats each associated with one of the different numerologies or one of the different waveforms.

An aspect of the present disclosure includes a user equipment (UE) including means for receiving a synchronization signal block (SSB) burst set having a plurality of SSBs that are time division multiplexed, wherein a first SSB of the plurality of SSBs and a second SSB of the plurality of SSBs have different numerologies or different waveforms, means for selecting a SSB of the plurality of SSBs, means for identifying cell information associated with a cell based on the SSB of the plurality of SSBs, and means for establishing a connection with the cell based on the cell information.

The UE above, further comprising means for obtaining at least one of flight level (FL) information or global navigation satellite system (GNSS), wherein selecting the SSB further comprises selecting the SSB based on the at least one of the FL information or the GNSS information.

Any of the UEs above, further comprising means for determining whether an altitude of the UE indicated in the FL information is greater than a threshold altitude, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix.

Any of the UEs above, further comprising means for determining whether a location of the UE indicated in the GNSS information is within a coastal region, wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

Any of the UEs above, further comprising means for determining whether an altitude of the UE indicated in the FL information is greater than a first threshold altitude associated with a low altitude and less than a second threshold altitude associated with a high altitude, wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

Any of the UEs above, further comprising means for identifying a frequency band to be searched, wherein selecting the SSB further comprises omitting, in response to the frequency band to be searched, one or more SSBs of the plurality of SSBs not associated with the frequency band to be searched.

Any of the UEs above, further comprising means for identifying a frequency band to be searched, wherein selecting the SSB further comprises selecting, in response to the frequency band to be searched, one or more SSBs of the plurality of SSBs associated only with the frequency band to be searched.

Any of the UEs above, further comprising means for identifying a same random access channel (RACH) occasion associated with both a first SSB of the plurality of SSBs and a second SSB of the plurality of SSBs, wherein the first SSB and the second SSB have a same numerology or a same waveform.

Any of the UEs above, further comprising means for identifying a same preamble format associated with both a first SSB of the plurality of SSBs and a second SSB of the plurality of SSBs, wherein the first SSB and the second SSB have a same numerology or a same waveform.

Any of the UEs above, further comprising means for identifying a same random access channel (RACH) occasion associated with both a first SSB of the plurality of SSBs and a second SSB of the plurality of SSBs, and means for identifying a same preamble format associated with both a first SSB of the plurality of SSBs and a second SSB of the plurality of SSBs, wherein the first SSB and the second SSB have a same numerology or a same waveform.

Any of the UEs above, further comprising identifying a first preamble sequence associated with the first SSB and a second preamble sequence associated with the second SSB, wherein the first preamble sequence and the second preamble format are different.

Any of the UEs above, further comprising means for identifying a first random access channel (RACH) occasion associated with a first SSB of the plurality of SSBs and a second RACH occasion associated with a second SSB of the plurality of SSBs, wherein the first RACH occasion and the second RACH occasion are different, wherein the first SSB has a first numerology or a first waveform different from a second numerology or a second waveform of the second SSB.

Any of the UEs above, further comprising means for identifying a first preamble format associated with a first SSB of the plurality of SSBs and a second preamble format associated with a second SSB of the plurality of SSBs, wherein the first preamble format and the second preamble format are different, wherein the first SSB has a first numerology or a first waveform different from a second numerology or a second waveform of the second SSB.

Any of the UEs above, further comprising means for identifying a first preamble format associated with a first SSB of the plurality of SSBs and a second preamble format associated with a second SSB of the plurality of SSBs, wherein the first preamble format and the second preamble format are different, and means for identifying a first random access channel (RACH) occasion associated with the first SSB and a second RACH occasion associated with the second SSB, wherein the first RACH occasion and the second RACH occasion are different, wherein the first SSB has a first numerology or a first waveform different from a second numerology or a second waveform of the second SSB.

Any of the UEs above, further comprising means for transmitting a random access channel (RACH) message using a RACH occasion and a preamble format selected from a plurality of different RACH occasions and a plurality of different preamble formats based on a waveform or a numerology of the SSB selected from the plurality of SSBs.

Any of the UEs above, wherein the preamble format comprises at least one of a waveform, an subcarrier spacing (SCS) and/or cyclic prefix (CP) length, or a length of a preamble sequence.

Any of the UEs above, further comprising means for decoding remaining minimum system information associated with the SSB to identify the RACH occasion and the preamble format.

Any of the UEs above, further comprising means for receiving configuration information including the plurality of different RACH occasions and the plurality of different preamble formats each associated with one of the different numerologies or one of the different waveforms.

Some aspects of the present disclosure include non-transitory computer readable media having instructions stored therein that, when executed by one or more processors of a user equipment (UE), cause the one or more processors to receive a synchronization signal block (SSB) burst set having a plurality of SSBs that are time division multiplexed, wherein a first SSB of the plurality of SSBs and a second SSB of the plurality of SSBs have different numerologies or different waveforms, select a SSB of the plurality of SSBs, identify cell information associated with a cell based on the SSB of the plurality of SSBs, and establish a connection with the cell based on the cell information.

Any of the non-transitory computer readable media above, further comprising instructions, when executed by the one or more processors, cause the one or more processors to obtain at least one of flight level (FL) information or global navigation satellite system (GNSS), wherein selecting the SSB further comprises selecting the SSB based on the at least one of the FL information or the GNSS information.

Any of the non-transitory computer readable media above, further comprising instructions, when executed by the one or more processors, cause the one or more processors to determine whether an altitude of the UE indicated in the FL information is greater than a threshold altitude, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix.

Any of the non-transitory computer readable media above, further comprising instructions, when executed by the one or more processors, cause the one or more processors to determine whether a location of the UE indicated in the GNSS information is within a coastal region, wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

Any of the non-transitory computer readable media above, further comprising instructions, when executed by the one or more processors, cause the one or more processors to determine whether an altitude of the UE indicated in the FL information is greater than a first threshold altitude associated with a low altitude and less than a second threshold altitude associated with a high altitude, wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

The non-transitory computer readable medium above, further comprising instructions, when executed by the one or more processors, cause the one or more processors to identify a frequency band to be searched, wherein selecting the SSB further comprises omitting, in response to the frequency band to be searched, one or more SSBs of the plurality of SSBs not associated with the frequency band to be searched.

Any of the non-transitory computer readable media above, further comprising instructions, when executed by the one or more processors, cause the one or more processors to identify a frequency band to be searched, wherein selecting the SSB further comprises selecting, in response to the frequency band to be searched, one or more SSBs of the plurality of SSBs associated only with the frequency band to be searched.

Any of the non-transitory computer readable media above, further comprising instructions, when executed by the one or more processors, cause the one or more processors to identify a same random access channel (RACH) occasion associated with both a first SSB of the plurality of SSBs and a second SSB of the plurality of SSBs, wherein the first SSB and the second SSB have a same numerology or a same waveform.

Any of the non-transitory computer readable media above, further comprising instructions, when executed by the one or more processors, cause the one or more processors to identify a same preamble format associated with both a first SSB of the plurality of SSBs and a second SSB of the plurality of SSBs, wherein the first SSB and the second SSB have a same numerology or a same waveform.

Any of the non-transitory computer readable media above, further comprising instructions, when executed by the one or more processors, cause the one or more processors to identify a same random access channel (RACH) occasion associated with both a first SSB of the plurality of SSBs and a second SSB of the plurality of SSBs, and identify a same preamble format associated with both a first SSB of the plurality of SSBs and a second SSB of the plurality of SSBs, wherein the first SSB and the second SSB have a same numerology or a same waveform.

Any of the non-transitory computer readable media above, further comprising instructions, when executed by the one or more processors, cause the one or more processors to identify a first preamble sequence associated with the first SSB and a second preamble sequence associated with the second SSB, wherein the first preamble sequence and the second preamble format are different.

Any of the non-transitory computer readable media above, further comprising instructions, when executed by the one or more processors, cause the one or more processors to identify a first random access channel (RACH) occasion associated with a first SSB of the plurality of SSBs and a second RACH occasion associated with a second SSB of the plurality of SSBs, wherein the first RACH occasion and the second RACH occasion are different, wherein the first SSB has a first numerology or a first waveform different from a second numerology or a second waveform of the second SSB.

Any of the non-transitory computer readable media above, further comprising instructions, when executed by the one or more processors, cause the one or more processors to identify a first preamble format associated with a first SSB of the plurality of SSBs and a second preamble format associated with a second SSB of the plurality of SSBs, wherein the first preamble format and the second preamble format are different, wherein the first SSB has a first numerology or a first waveform different from a second numerology or a second waveform of the second SSB.

Any of the non-transitory computer readable media above, further comprising instructions, when executed by the one or more processors, cause the one or more processors to identify a first preamble format associated with a first SSB of the plurality of SSBs and a second preamble format associated with a second SSB of the plurality of SSBs, wherein the first preamble format and the second preamble format are different, and identify a first random access channel (RACH) occasion associated with the first SSB and a second RACH occasion associated with the second SSB, wherein the first RACH occasion and the second RACH occasion are different, wherein the first SSB has a first numerology or a first waveform different from a second numerology or a second waveform of the second SSB.

Any of the non-transitory computer readable media above, further comprising instructions, when executed by the one or more processors, cause the one or more processors to transmit a random access channel (RACH) message using a RACH occasion and a preamble format selected from a plurality of different RACH occasions and a plurality of different preamble formats based on a waveform or a numerology of the SSB selected from the plurality of SSBs.

Any of the non-transitory computer readable media above, wherein the preamble format comprises at least one of a waveform, an subcarrier spacing (SCS) and/or cyclic prefix (CP) length, or a length of a preamble sequence.

Any of the non-transitory computer readable media above, further comprising instructions for decoding remaining minimum system information associated with the SSB to identify the RACH occasion and the preamble format.

Any of the non-transitory computer readable media above, further comprising instructions for receiving configuration information including the plurality of different RACH occasions and the plurality of different preamble formats each associated with one of the different numerologies or one of the different waveforms.

Aspects of the present disclosure include methods by a base station (BS) for transmitting, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and establishing a connection with the UE based on the UE selecting a SSB from the plurality of SSBs and identifying cell information of the BS.

Aspects of the present disclosure includes the method above, further comprising transmitting information indicating a same random access channel (RACH) occasion in both a first SSB of the plurality of SSBs and a second SSB of the plurality of SSBs, wherein the first SSB and the second SSB have a same numerology or a same waveform.

Aspects of the present disclosure includes any of the methods above, further comprising transmitting information indicating a same preamble format in both a first SSB of the plurality of SSBs and a second SSB of the plurality of SSBs, wherein the first SSB and the second SSB have a same numerology or a same waveform.

Aspects of the present disclosure includes any of the methods above, further comprising transmitting first information indicating a same random access channel (RACH) occasion in both a first SSB of the plurality of SSBs and a second SSB of the plurality of SSBs, and transmitting second information indicating a same preamble format in both a first SSB of the plurality of SSBs and a second SSB of the plurality of SSBs, wherein the first SSB and the second SSB have a same numerology or a same waveform.

Aspects of the present disclosure includes any of the methods above, further comprising transmitting first information indicating a first random access channel (RACH) occasion in a first SSB of the plurality of SSBs and second information indicating a second RACH occasion in a second SSB of the plurality of SSBs, wherein the first RACH occasion and the second RACH occasion are different, wherein the first SSB has a first numerology or a first waveform different from a second numerology or a second waveform of the second SSB.

Aspects of the present disclosure includes any of the methods above, further comprising transmitting first information indicating a first preamble format in a first SSB of the plurality of SSBs and second information indicating a second preamble format in a second SSB of the plurality of SSBs, wherein the first preamble format and the second preamble format are different, wherein the first SSB has a first numerology or a first waveform different from a second numerology or a second waveform of the second SSB.

Aspects of the present disclosure includes any of the methods above, further comprising transmitting first information a first preamble format in a first SSB of the plurality of SSBs and second information a second preamble format in a second SSB of the plurality of SSBs, wherein the first preamble format and the second preamble format are different and transmitting third information a first random access channel (RACH) occasion in the first SSB and transmitting fourth information a second RACH occasion in the second SSB, wherein the first RACH occasion and the second RACH occasion are different, wherein the first SSB has a first numerology or a first waveform different from a second numerology or a second waveform of the second SSB Aspects of the present disclosure includes any of the methods above, further comprising receiving a random access channel (RACH) message from the UE based on the UE using a RACH occasion and a preamble format selected from a plurality of different RACH occasions and a plurality of different preamble formats based on a waveform or a numerology of the SSB selected from the plurality of SSBs.

Aspects of the present disclosure includes any of the methods above, wherein the preamble format comprises at least one of a waveform, an subcarrier spacing (SCS) and/or cyclic prefix (CP) length, or a length of a preamble sequence.

Aspects of the present disclosure includes any of the methods above, further comprising transmitting remaining minimum system information associated with the SSB for identifying the RACH occasion and the preamble format.

Aspects of the present disclosure includes any of the methods above, further comprising transmitting configuration information including the plurality of different RACH occasions and the plurality of different preamble formats each associated with one of the different numerologies or one of the different waveforms.

Other aspects of the present disclosure include a base station (BS) having a memory comprising instructions, a transceiver, and one or more processors operatively coupled with the memory and the transceiver, the one or more processors configured to execute instructions in the memory to transmit, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and establish a connection with the UE based on the UE selecting a SSB from the plurality of SSBs and identifying cell information of the BS.

Aspects of the present disclosure includes the BS above, wherein the one or more processors are further configured to transmit information indicating a same random access channel (RACH) occasion in both a first SSB of the plurality of SSBs and a second SSB of the plurality of SSBs, wherein the first SSB and the second SSB have a same numerology or a same waveform.

Aspects of the present disclosure includes any of the BSs above, wherein the one or more processors are further configured to transmit information indicating a same preamble format in both a first SSB of the plurality of SSBs and a second SSB of the plurality of SSBs, wherein the first SSB and the second SSB have a same numerology or a same waveform.

Aspects of the present disclosure includes any of the BSs above, wherein the one or more processors are further configured to transmit first information indicating a same random access channel (RACH) occasion in both a first SSB of the plurality of SSBs and a second SSB of the plurality of SSBs, and transmit second information indicating a same preamble format in both a first SSB of the plurality of SSBs and a second SSB of the plurality of SSBs, wherein the first SSB and the second SSB have a same numerology or a same waveform.

Aspects of the present disclosure includes any of the BSs above, wherein the one or more processors are further configured to transmit first information indicating a first random access channel (RACH) occasion in a first SSB of the plurality of SSBs and second information indicating a second RACH occasion in a second SSB of the plurality of SSBs, wherein the first RACH occasion and the second RACH occasion are different, wherein the first SSB has a first numerology or a first waveform different from a second numerology or a second waveform of the second SSB.

Aspects of the present disclosure includes any of the BSs above, wherein the one or more processors are further configured to transmit first information indicating a first preamble format in a first SSB of the plurality of SSBs and second information indicating a second preamble format in a second SSB of the plurality of SSBs, wherein the first preamble format and the second preamble format are different, wherein the first SSB has a first numerology or a first waveform different from a second numerology or a second waveform of the second SSB.

Aspects of the present disclosure includes any of the BSs above, wherein the one or more processors are further configured to transmit first information a first preamble format in a first SSB of the plurality of SSBs and second information a second preamble format in a second SSB of the plurality of SSBs, wherein the first preamble format and the second preamble format are different and transmit third information a first random access channel (RACH) occasion in the first SSB and transmitting fourth information a second RACH occasion in the second SSB, wherein the first RACH occasion and the second RACH occasion are different, wherein the first SSB has a first numerology or a first waveform different from a second numerology or a second waveform of the second SSB Aspects of the present disclosure includes any of the BSs above, wherein the one or more processors are further configured to receive a random access channel (RACH) message from the UE based on the UE using a RACH occasion and a preamble format selected from a plurality of different RACH occasions and a plurality of different preamble formats based on a waveform or a numerology of the SSB selected from the plurality of SSBs.

Aspects of the present disclosure includes any of the BSs above, wherein the preamble format comprises at least one of a waveform, an subcarrier spacing (SCS) and/or cyclic prefix (CP) length, or a length of a preamble sequence.

Aspects of the present disclosure includes any of the BSs above, wherein the one or more processors are further configured to transmit remaining minimum system information associated with the SSB for identifying the RACH occasion and the preamble format.

Aspects of the present disclosure includes any of the BSs above, wherein the one or more processors are further configured to transmit configuration information including the plurality of different RACH occasions and the plurality of different preamble formats each associated with one of the different numerologies or one of the different waveforms.

An aspect of the present disclosure includes a base station (BS) including means for transmitting, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and means for establishing a connection with the UE based on the UE selecting a SSB from the plurality of SSBs and identifying cell information of the BS.

Aspects of the present disclosure includes the method above, further comprising means for transmitting information indicating a same random access channel (RACH) occasion in both a first SSB of the plurality of SSBs and a second SSB of the plurality of SSBs, wherein the first SSB and the second SSB have a same numerology or a same waveform.

Aspects of the present disclosure includes any of the methods above, further comprising means for transmitting information indicating a same preamble format in both a first SSB of the plurality of SSBs and a second SSB of the plurality of SSBs, wherein the first SSB and the second SSB have a same numerology or a same waveform.

Aspects of the present disclosure includes any of the methods above, further comprising means for transmitting first information indicating a same random access channel (RACH) occasion in both a first SSB of the plurality of SSBs and a second SSB of the plurality of SSBs, and means for transmitting second information indicating a same preamble format in both a first SSB of the plurality of SSBs and a second SSB of the plurality of SSBs, wherein the first SSB and the second SSB have a same numerology or a same waveform.

Aspects of the present disclosure includes any of the methods above, further comprising means for transmitting first information indicating a first random access channel (RACH) occasion in a first SSB of the plurality of SSBs and second information indicating a second RACH occasion in a second SSB of the plurality of SSBs, wherein the first RACH occasion and the second RACH occasion are different, wherein the first SSB has a first numerology or a first waveform different from a second numerology or a second waveform of the second SSB.

Aspects of the present disclosure includes any of the methods above, further comprising means for transmitting first information indicating a first preamble format in a first SSB of the plurality of SSBs and second information indicating a second preamble format in a second SSB of the plurality of SSBs, wherein the first preamble format and the second preamble format are different, wherein the first SSB has a first numerology or a first waveform different from a second numerology or a second waveform of the second SSB.

Aspects of the present disclosure includes any of the methods above, further comprising means for transmitting first information a first preamble format in a first SSB of the plurality of SSBs and second information a second preamble format in a second SSB of the plurality of SSBs, wherein the first preamble format and the second preamble format are different and means for transmitting third information a first random access channel (RACH) occasion in the first SSB and transmitting fourth information a second RACH occasion in the second SSB, wherein the first RACH occasion and the second RACH occasion are different, wherein the first SSB has a first numerology or a first waveform different from a second numerology or a second waveform of the second SSB Aspects of the present disclosure includes any of the methods above, further comprising means for receiving a random access channel (RACH) message from the UE based on the UE using a RACH occasion and a preamble format selected from a plurality of different RACH occasions and a plurality of different preamble formats based on a waveform or a numerology of the SSB selected from the plurality of SSBs.

Aspects of the present disclosure includes any of the methods above, wherein the preamble format comprises at least one of a waveform, an subcarrier spacing (SCS) and/or cyclic prefix (CP) length, or a length of a preamble sequence.

Aspects of the present disclosure includes any of the methods above, further comprising means for transmitting remaining minimum system information associated with the SSB for identifying the RACH occasion and the preamble format.

Aspects of the present disclosure includes any of the methods above, further comprising means for transmitting configuration information including the plurality of different RACH occasions and the plurality of different preamble formats each associated with one of the different numerologies or one of the different waveforms.

Some aspects of the present disclosure include non-transitory computer readable media having instructions stored therein that, when executed by one or more processors of a base station (BS), cause the one or more processors to transmit, to a user equipment (UE), a synchronization signal block (SSB) burst set having a plurality of SSBs that are time division multiplexed, wherein a first SSB of the plurality of SSBs and a second SSB of the plurality of SSBs have different numerologies or different waveforms and establish a connection with the UE based on the UE selecting a SSB from the plurality of SSBs and identifying cell information of the BS.

Aspects of the present disclosure includes the non-transitory computer readable medium above, wherein the one or more processors are further configured to transmit information indicating a same random access channel (RACH) occasion in both a first SSB of the plurality of SSBs and a second SSB of the plurality of SSBs, wherein the first SSB and the second SSB have a same numerology or a same waveform.

Aspects of the present disclosure includes any of the non-transitory computer readable media above, further comprising instructions for transmitting information indicating a same preamble format in both a first SSB of the plurality of SSBs and a second SSB of the plurality of SSBs, wherein the first SSB and the second SSB have a same numerology or a same waveform.

Aspects of the present disclosure includes any of the non-transitory computer readable media above, further comprising instructions for transmitting first information indicating a same random access channel (RACH) occasion in both a first SSB of the plurality of SSBs and a second SSB of the plurality of SSBs, and transmit second information indicating a same preamble format in both a first SSB of the plurality of SSBs and a second SSB of the plurality of SSBs, wherein the first SSB and the second SSB have a same numerology or a same waveform.

Aspects of the present disclosure includes any of the non-transitory computer readable media above, further comprising instructions for transmitting first information indicating a first random access channel (RACH) occasion in a first SSB of the plurality of SSBs and second information indicating a second RACH occasion in a second SSB of the plurality of SSBs, wherein the first RACH occasion and the second RACH occasion are different, wherein the first SSB has a first numerology or a first waveform different from a second numerology or a second waveform of the second SSB.

Aspects of the present disclosure includes any of the non-transitory computer readable media above, further comprising instructions for transmitting first information indicating a first preamble format in a first SSB of the plurality of SSBs and second information indicating a second preamble format in a second SSB of the plurality of SSBs, wherein the first preamble format and the second preamble format are different, wherein the first SSB has a first numerology or a first waveform different from a second numerology or a second waveform of the second SSB.

Aspects of the present disclosure includes any of the non-transitory computer readable media above, further comprising instructions for transmitting first information a first preamble format in a first SSB of the plurality of SSBs and second information a second preamble format in a second SSB of the plurality of SSBs, wherein the first preamble format and the second preamble format are different and transmit third information a first random access channel (RACH) occasion in the first SSB and transmitting fourth information a second RACH occasion in the second SSB, wherein the first RACH occasion and the second RACH occasion are different, wherein the first SSB has a first numerology or a first waveform different from a second numerology or a second waveform of the second SSB Aspects of the present disclosure includes any of the non-transitory computer readable media above, further comprising instructions for receiving a random access channel (RACH) message from the UE based on the UE using a RACH occasion and a preamble format selected from a plurality of different RACH occasions and a plurality of different preamble formats based on a waveform or a numerology of the SSB selected from the plurality of SSBs.

Aspects of the present disclosure includes any of the non-transitory computer readable media above, wherein the preamble format comprises at least one of a waveform, an subcarrier spacing (SCS) and/or cyclic prefix (CP) length, or a length of a preamble sequence.

Aspects of the present disclosure includes any of the non-transitory computer readable media above, further comprising instructions for transmitting remaining minimum system information associated with the SSB for identifying the RACH occasion and the preamble format.

Aspects of the present disclosure includes any of the BSs above, further comprising instructions for transmitting configuration information including the plurality of different RACH occasions and the plurality of different preamble formats each associated with one of the different numerologies or one of the different waveforms.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
  obtaining at least one of flight level (FL) information or global navigation satellite system (GNSS) information;
  determining whether an altitude of the UE indicated in the FL information is greater than a threshold altitude;
  receiving a synchronization signal block (SSB) burst set having a plurality of SSBs that are time division multiplexed, wherein a first SSB of the plurality of SSBs and a second SSB of the plurality of SSBs have different numerologies or different waveforms;
  selecting a SSB of the plurality of SSBs, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix;
  identifying cell information associated with a cell based on the SSB of the plurality of SSBs; and
  establishing a connection with the cell based on the cell information.

2. The method of claim 1, further comprising:
  determining whether a location of the UE indicated in the GNSS information is within a coastal region;
  wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

3. The method of claim 1, further comprising:
  determining whether an altitude of the UE indicated in the FL information is greater than a first threshold altitude associated with a low altitude and less than a second threshold altitude associated with a high altitude;
  wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

4. The method of claim 1, further comprising:
  identifying a frequency band to be searched;
  wherein selecting the SSB further comprises omitting, in response to the frequency band to be searched, one or more SSBs of the plurality of SSBs not associated with the frequency band to be searched.

5. The method of claim 1, further comprising:
  identifying a frequency band to be searched;
  wherein selecting the SSB further comprises selecting, in response to the frequency band to be searched, one or more SSBs of the plurality of SSBs associated only with the frequency band to be searched.

6. The method of claim 1, further comprising:
  identifying a first random access channel (RACH) occasion associated with a first SSB of the plurality of SSBs and a second RACH occasion associated with a second SSB of the plurality of SSBs, wherein the first RACH occasion and the second RACH occasion are different,
  wherein the first SSB has a first numerology or a first waveform different from a second numerology or a second waveform of the second SSB.

7. The method of claim 1, further comprising:
  identifying a first preamble format associated with a first SSB of the plurality of SSBs and a second preamble format associated with a second SSB of the plurality of SSBs, wherein the first preamble format and the second preamble format are different, wherein the first SSB has a first numerology or a first waveform different from a second numerology or a second waveform of the second SSB.

8. The method of claim 1, further comprising:
  identifying a first preamble format associated with a first SSB of the plurality of SSBs and a second preamble format associated with a second SSB of the plurality of SSBs, wherein the first preamble format and the second preamble format are different; and
  identifying a first random access channel (RACH) occasion associated with the first SSB and a second RACH occasion associated with the second SSB, wherein the first RACH occasion and the second RACH occasion are different;
  wherein the first SSB has a first numerology or a first waveform different from a second numerology or a second waveform of the second SSB.

9. The method of claim 1, further comprising:
  transmitting a random access channel (RACH) message using a RACH occasion and a preamble format selected from a plurality of different RACH occasions and a plurality of different preamble formats based on a waveform or a numerology of the SSB selected from the plurality of SSBs.

10. The method of claim 9, wherein the preamble format comprises at least one of a waveform, a subcarrier spacing (SCS) and/or cyclic prefix (CP) length, or a length of a preamble sequence.

11. The method of claim 9, further comprising decoding remaining minimum system information associated with the SSB to identify the RACH occasion and the preamble format.

12. The method of claim 9, further comprising receiving configuration information including the plurality of different RACH occasions and the plurality of different preamble formats each associated with one of the different numerologies or one of the different waveforms.

13. A user equipment (UE), comprising:
  memory comprising instructions;
  a transceiver; and
  one or more processors operatively coupled with the memory and the transceiver, the one or more processors configured to execute instructions in the memory to:
    obtain at least one of flight level (FL) information or global navigation satellite system (GNSS) information;
    determine whether an altitude of the UE indicated in the FL information is greater than a threshold altitude;
    receive a synchronization signal block (SSB) burst set having a plurality of SSBs that are time division multiplexed, wherein a first SSB of the plurality of SSBs and a second SSB of the plurality of SSBs have different numerologies or different waveforms;
    select a SSB of the plurality of SSBs, wherein the one or more processors are further configured to select, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix;
identify cell information associated with a cell based on the SSB of the plurality of SSBs; and
establish a connection with the cell based on the cell information.

14. The UE of claim 13, wherein the one or more processors are further configured to:
determine whether a location of the UE indicated in the GNSS information is within a coastal region;
wherein selecting the SSB further comprises selecting, in response to the location being within the coastal region, one or more SSBs of the plurality of SSBs having a numerology defined by a subcarrier spacing greater than a threshold subcarrier spacing and a cyclic prefix less than a threshold cyclic prefix.

15. The UE of claim 13, wherein the one or more processors are further configured to:
determine whether an altitude of the UE indicated in the FL information is greater than a first threshold altitude associated with a low altitude and less than a second threshold altitude associated with a high altitude;
wherein selecting the SSB further comprises selecting, in response to the altitude being between the first threshold altitude and the second threshold altitude, one or more SSBs of the plurality of SSBs having a numerology defined by a subcarrier spacing greater than a threshold subcarrier spacing and a cyclic prefix less than a threshold cyclic prefix.

16. The UE of claim 13, wherein the one or more processors are further configured to:
identify a frequency band to be searched;
wherein selecting the SSB further comprises omitting, in response to the frequency band to be searched, one or more SSBs of the plurality of SSBs not associated with the frequency band to be searched.

17. The UE of claim 13, wherein the one or more processors are further configured to:
identify a frequency band to be searched;
wherein selecting the SSB further comprises selecting, in response to the frequency band to be searched, one or more SSBs of the plurality of SSBs associated only with the frequency band to be searched.

18. A non-transitory computer readable medium having instructions stored therein that, when executed by one or more processors of a user equipment (UE), cause the one or more processors to:

obtain at least one of flight level (FL) information or global navigation satellite system (GNSS) information;
determine whether an altitude of the UE indicated in the FL information is greater than a threshold altitude;
receive a synchronization signal block (SSB) burst set having a plurality of SSBs that are time division multiplexed, wherein a first SSB of the plurality of SSBs and a second SSB of the plurality of SSBs have different numerologies or different waveforms;
select a SSB of the plurality of SSBs, wherein selecting the SSB further comprises selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix;
identify cell information associated with a cell based on the SSB of the plurality of SSBs; and
establish a connection with the cell based on the cell information.

19. A user equipment (UE), comprising:
means for obtaining at least one of flight level (FL) information or global navigation satellite system (GNSS) information;
means for determining whether an altitude of the UE indicated in the FL information is greater than a threshold altitude;
means for receiving a synchronization signal block (SSB) burst set having a plurality of SSBs that are time division multiplexed, wherein a first SSB of the plurality of SSBs and a second SSB of the plurality of SSBs have different numerologies or different waveforms;
means for selecting a SSB of the plurality of SSBs, wherein the means for selecting the SSB further comprises means for selecting, in response to the altitude being greater than the threshold altitude, one or more SSBs of the plurality of SSBs having a numerology defined by a subcarrier spacing greater than a threshold subcarrier spacing and a cyclic prefix greater than a threshold cyclic prefix;
means for identifying cell information associated with a cell based on the SSB of the plurality of SSBs; and
means for establishing a connection with the cell based on the cell information.

* * * * *